United States Patent
White et al.

(10) Patent No.: US 11,119,725 B2
(45) Date of Patent: Sep. 14, 2021

(54) CUSTOMIZABLE EMBEDDED VOCAL COMMAND SETS FOR A LIGHTING AND/OR OTHER ENVIRONMENTAL CONTROLLER

(71) Applicant: ABL IP HOLDING LLC, Conyers, GA (US)

(72) Inventors: Sean P. White, Reston, VA (US); Daniel M. Megginson, Fairfax, VA (US); Januk Aggarwal, Alexandria, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 120 days.

(21) Appl. No.: 16/144,152

(22) Filed: Sep. 27, 2018

(65) Prior Publication Data

US 2020/0104094 A1    Apr. 2, 2020

(51) Int. Cl.
*G06F 3/16* (2006.01)
*H04L 12/28* (2006.01)
(Continued)

(52) U.S. Cl.
CPC .............. *G06F 3/167* (2013.01); *G10L 15/22* (2013.01); *G10L 17/00* (2013.01); *H04L 12/282* (2013.01);
(Continued)

(58) Field of Classification Search
CPC ......... G06F 3/167; G10L 15/22; G10L 17/00; H04L 12/282
(Continued)

(56) References Cited

U.S. PATENT DOCUMENTS 4,749,254 A    6/1988 Seaver
5,705,804 A    1/1998 Ramer et al.
(Continued)

FOREIGN PATENT DOCUMENTS

WO    2011121470 A1    10/2011

OTHER PUBLICATIONS

Jan Jongboom, "Firmware updates on mbed OS 5.5 with FlashIAP" (/blog/entry/firmware-updates-mbed-5-flashiap/), Last updated Oct. 6, 2017, 4 pages.
(Continued)

*Primary Examiner* — Michael Colucci
(74) *Attorney, Agent, or Firm* — RatnerPrestia

(57) ABSTRACT

A control module, for lighting or other environmental control or the like has embedded voice responsive control capability. The recognizable command set supported by the control module is customizable. Software for a data processor configures the control module to identify a user in the vicinity of the control module and change voice response software based at least in part on identity of the user. The changed voice response software configures the control module, to recognize a customized set of vocal commands, e.g. associated with the identified user, in response to speech detected via a microphone and an audio processor of the control module, without requiring network communication. The control module issues control signals to equipment controlled by the module that correspond to the recognized commands of the customized vocal command set.

18 Claims, 16 Drawing Sheets

(51) Int. Cl.
    *G10L 15/22*    (2006.01)
    *G10L 17/00*    (2013.01)
    *G10L 15/06*    (2013.01)
(52) U.S. Cl.
    CPC ............... *G10L 2015/0631* (2013.01); *G10L 2015/0638* (2013.01)
(58) Field of Classification Search
    USPC ........................................................ 704/275
    See application file for complete search history.

(56)  References Cited

U.S. PATENT DOCUMENTS

| | | | |
|---|---|---|---|
| 5,769,527 | A | 6/1998 | Taylor et al. |
| 5,914,487 | A | 6/1999 | Ramer et al. |
| 6,009,455 | A | 12/1999 | Doyle |
| 6,043,873 | A | 3/2000 | Ramer et al. |
| 6,363,434 | B1 | 3/2002 | Eytchison |
| 6,458,967 | B1 | 10/2002 | Detty et al. |
| 7,003,547 | B1 | 2/2006 | Hubbard |
| 7,099,825 | B1* | 8/2006 | Cook ................ G06Q 30/02 379/202.01 |
| 7,202,613 | B2 | 4/2007 | Morgan et al. |
| 7,333,903 | B2 | 2/2008 | Walters et al. |
| 7,519,534 | B2* | 4/2009 | Maddux ............. G06Q 30/02 704/255 |
| 7,546,167 | B2 | 6/2009 | Walters et al. |
| 7,555,300 | B2 | 6/2009 | Scheinert et al. |
| 7,925,384 | B2 | 4/2011 | Hulzenga et al. |
| 8,130,371 | B2 | 3/2012 | Imura |
| 8,140,276 | B2 | 3/2012 | Walters |
| 8,547,036 | B2 | 10/2013 | Tran |
| 8,614,766 | B1 | 12/2013 | Clark |
| 8,732,031 | B2 | 5/2014 | Martin et al. |
| 8,749,146 | B2 | 6/2014 | Jones |
| 8,755,039 | B2 | 6/2014 | Ramer et al. |
| 8,829,821 | B2 | 9/2014 | Chobot et al. |
| 9,137,879 | B2 | 9/2015 | Rains et al. |
| 9,204,523 | B2 | 12/2015 | Reed et al. |
| 10,178,746 | B2 | 1/2019 | Yadav et al. |
| 10,278,261 | B2 | 4/2019 | Aggarwal et al. |
| 2002/0016639 | A1 | 2/2002 | Smith et al. |
| 2003/0101459 | A1 | 5/2003 | Edson |
| 2004/0036006 | A1 | 2/2004 | Dowling |
| 2004/0052076 | A1 | 3/2004 | Mueller et al. |
| 2005/0035728 | A1 | 2/2005 | Schanberger et al. |
| 2005/0187770 | A1* | 8/2005 | Kompe ................ G10L 15/065 704/250 |
| 2006/0075407 | A1 | 4/2006 | Powers et al. |
| 2006/0075408 | A1 | 4/2006 | Powers et al. |
| 2006/0212295 | A1* | 9/2006 | Wasserblat ............ G10L 25/48 704/252 |
| 2007/0045524 | A1 | 3/2007 | Rains et al. |
| 2007/0268687 | A1 | 11/2007 | Scannell |
| 2008/0215391 | A1 | 9/2008 | Dowling et al. |
| 2008/0265799 | A1 | 10/2008 | Sibert |
| 2009/0051506 | A1 | 2/2009 | Hicksted et al. |
| 2009/0143044 | A1 | 6/2009 | Thorson et al. |
| 2009/0299527 | A1 | 12/2009 | Huizenga et al. |
| 2010/0114340 | A1 | 5/2010 | Huizenga et al. |
| 2010/0176733 | A1 | 7/2010 | King |
| 2010/0259931 | A1 | 10/2010 | Chemel et al. |
| 2010/0301769 | A1 | 12/2010 | Chemel et al. |
| 2011/0021143 | A1 | 1/2011 | Kapur et al. |
| 2011/0054900 | A1* | 3/2011 | Phillips ................ G10L 15/30 704/235 |
| 2011/0199004 | A1 | 8/2011 | Henig et al. |
| 2012/0002406 | A1 | 1/2012 | Leadford et al. |
| 2012/0013257 | A1 | 1/2012 | Sibert |
| 2012/0019162 | A1 | 1/2012 | Budike |
| 2012/0025717 | A1 | 2/2012 | Klusmann et al. |
| 2012/0037725 | A1 | 2/2012 | Verfuerth |
| 2012/0040606 | A1 | 2/2012 | Verfuerth |
| 2012/0044350 | A1 | 2/2012 | Verfuerth |
| 2012/0086561 | A1 | 4/2012 | Ilyes et al. |
| 2012/0109649 | A1* | 5/2012 | Talwar ................. G10L 15/005 704/236 |
| 2012/0130548 | A1 | 5/2012 | Fadell et al. |
| 2012/0217880 | A1 | 8/2012 | Nieuwlands et al. |
| 2012/0226981 | A1* | 9/2012 | Clavin .................. G06F 3/005 715/719 |
| 2012/0229048 | A1 | 9/2012 | Archer |
| 2012/0235579 | A1 | 9/2012 | Chemel et al. |
| 2012/0299486 | A1 | 11/2012 | Birru |
| 2013/0159754 | A1 | 6/2013 | Wendt |
| 2013/0185072 | A1* | 7/2013 | Huang ................. G10L 15/30 704/246 |
| 2013/0234598 | A1 | 9/2013 | Bora et al. |
| 2013/0253925 | A1* | 9/2013 | Jonsson ............ H04L 12/2827 704/233 |
| 2013/0293112 | A1 | 11/2013 | Reed et al. |
| 2013/0293155 | A1 | 11/2013 | Campbell et al. |
| 2013/0320861 | A1 | 12/2013 | Sinai et al. |
| 2014/0001959 | A1 | 1/2014 | Motley et al. |
| 2014/0032223 | A1* | 1/2014 | Powe ................. G06F 19/3456 704/275 |
| 2014/0035482 | A1 | 2/2014 | Rains et al. |
| 2014/0303961 | A1* | 10/2014 | Leydon ................ G10L 13/08 704/2 |
| 2014/0354160 | A1 | 12/2014 | Aggarwal et al. |
| 2015/0293504 | A1 | 10/2015 | Blum et al. |
| 2015/0296594 | A1 | 10/2015 | Blum et al. |
| 2016/0217790 | A1* | 7/2016 | Sharifi .................. G10L 15/01 |
| 2018/0157646 | A1* | 6/2018 | Yang .................... G06F 40/151 |
| 2018/0158460 | A1* | 6/2018 | Lee ....................... H05B 47/12 |
| 2018/0358009 | A1* | 12/2018 | Daley .................... G06F 3/167 |
| 2019/0318724 | A1* | 10/2019 | Chao .................... G10L 15/14 |
| 2019/0346169 | A1* | 11/2019 | Pate ..................... F24F 11/523 |
| 2019/0353379 | A1* | 11/2019 | Lee ...................... G05B 15/02 |
| 2020/0064007 | A1* | 2/2020 | Escapa ............... H04L 12/2803 |

OTHER PUBLICATIONS

Notice of Allowance for U.S. Appl. No. 15/177,782, dated Mar. 18, 2020, 21 pages.
Final Office Acction for U.S. Appl. No. 15/676,479, dated Mar. 26, 2020, 15 pages.
Notice of Allowance for U.S. Appl. No. 15/974,250, dated Mar. 27, 2020, 76 pages.
Davies, C., "Philips Hue Review", SlashGear; http://www.slashgear.com/philips-hue-review-07255955/; Nov. 7, 2012, London, United Kingdom, 13 pages.
European Communication for European Application No. 14 835 987.0, dated Sep. 26, 2018, 15 pages.
Extended European Search Report for European Application No. 14 835 987.0, dated May 3, 2017, 12 pages.
Final Office Action for U.S. Appl. No. 14/219,657, dated Nov. 19, 2015, 59 pages.
Final Office Action for U.S. Appl. No. 13/964,564, dated Nov. 20, 2015, 59 pages.
Final Office Action for U.S. Appl. No. 14/507,222, dated Dec. 10, 2015, 63 pages.
Final Office Action for U.S. Appl. No. 13/964,564, dated Oct. 21, 2016, 50 pages.
Final Office Action for U.S. Appl. No. 15/363,526, dated May 3, 2017, 19 pages.
Final Office Action for U.S. Appl. No. 13/964,564, dated Sep. 22, 2017, 49 pages.
Final Office Action for U.S. Appl. No. 15/720,546, dated Apr. 30, 2018, 20 pages.
Final Office Action for U.S. Appl. No. 15/357,162, dated Mar. 5, 2019, 47 pages.
Final Office Action for U.S. Appl. No. 15/365,087, dated Apr. 4, 2019, 55 pages.
International Search Report and Written Opinion for International Application No. PCT/US2013/037968, dated Jul. 2, 2013, 9 pages.
International Search Report and Written Opinion for International Application No. PCT/US2013/050657, dated Jan. 9, 2014, 10 pages.

(56) References Cited

OTHER PUBLICATIONS

International Search Report and Written Opinion for International Application No. PCT/US2014/050520, dated Nov. 20, 2014, 10 pages.
"Introducing Philips Hue: The World's Smartest LED Bulb, Marking a New Era in Home Lighting", Philips Sense and Simplicity; http://newscenter/philips.com/main/standard/news/press/2012/20121029-Introducing- . . . ; Oct. 29, 2012, Amsterdam, The Netherlands, 3 pages.
Non Final Office Action for U.S. Appl. No. 13/964,564, dated Mar. 20, 2015, 44 pages.
Non Final Office Action for U.S. Appl. No. 14/219,657, dated Mar. 26, 2015, 58 pages.
Non Final Office Action for U.S. Appl. No. 14/507,222, dated Mar. 30, 2015, 60 pages.
Non Final Office Action for U.S. Appl. No. 13/971,194, dated Dec. 9, 2015, 20 pages.
Non Final Office Action for U.S. Appl. No. 13/971,428, dated Feb. 25, 2016, 16 pages.
Non Final Office Action for U.S. Appl. No. 14/507,222, dated Jun. 1, 2016, 54 pages.
Non Final Office Action for U.S. Appl. No. 13/964,564, dated Jun. 3, 2016, 57 pages.
Non Final Office Action for U.S. Appl. No. 13/971,194, dated Jun. 23, 2016, 19 pages.
Non Final Office Action for U.S. Appl. No. 15/259,612, dated Nov. 17, 2016, 16 pages.
Non Final Office Action for U.S. Appl. No. 15/363,526, dated Feb. 10 2017, 17 pages.
Non Final Office Action for U.S. Appl. No. 13/964,564, dated Mar. 9, 2017, 114 pages.
Non Final Office Action for U.S. Appl. No. 15/228,463, dated May 2, 2017, 22 pages.
Non Final Office Action for U.S. Appl. No. 15/720,546, dated Oct. 30, 2017, 11 pages.
Non Final Office Action for U.S. Appl. No. 15/357,162, dated Aug. 24, 2018, 57 pages.
Non Final Office Action for U.S. Appl. No. 15/720,546, dated Aug. 31, 2018, 10 pages.
Non Final Office Action for U.S. Appl. No. 15/365,087, dated Sep. 20, 2018, 62 pages.
Non Final Office Action for U.S. Appl. No. 15/177,782, dated Sep. 9, 2019, 76 pages.
Notice of Allowance for U.S. Appl. No. 14/219,657, dated Mar. 18, 2016, 20 pages.
Notice of Allowance for U.S. Appl. No. 13/903,428, dated Apr. 5, 2016, 32 pages.
Notice of Allowance for U.S. Appl. No. 13/971,428, dated Jun. 7, 2016, 15 pages.
Notice of Allowance for U.S. Appl. No. 13/971,194, dated Oct. 24, 2016, 16 pages.
Notice of Allowance for U.S. Appl. No. 14/507,222, dated Nov. 25, 2016, 36 pages.
Notice of Allowance for U.S. Appl. No. 15/259,612, dated Feb. 1, 2017, 12 pages.
Notice of Allowance for U.S. Appl. No. 15/259,612, dated Jun. 5, 2017, 11 pages.
Notice of Allowance for U.S. Appl. No. 15/363,526, dated Jul. 14, 2017, 15 pages.
Notice of Allowance for U.S. Appl. No. 15/228,463, dated Sep. 13, 2017, 18 pages.
Notice of Allowance for U.S. Appl. No. 13/964,564, dated Jan. 23, 2018, 25 pages.
Notice of Allowance for U.S. Appl. No. 15/720,546, dated Dec. 19, 2018, 23 pages.
Notice of Allowance for U.S. Appl. No. 15/957,363, dated Apr. 3, 2019, 38 pages.
Notice of Allowance for U.S. Appl. No. 15/365,087, dated Jun. 17, 2019, 12 pages.
"Raspberry Pi a $30 Computer Set to Revolutionize the Teaching of Computing", Silver-Fish hubpages; http://silver-fish.hubpages.com/hub/Raspberry-Pi-a-30-Computer; Aug. 15, 2012, 4 pages.
Non Final Office Action for U.S. Appl. No. 15/676,479, dated Dec. 12, 2019, 73 pages.

* cited by examiner

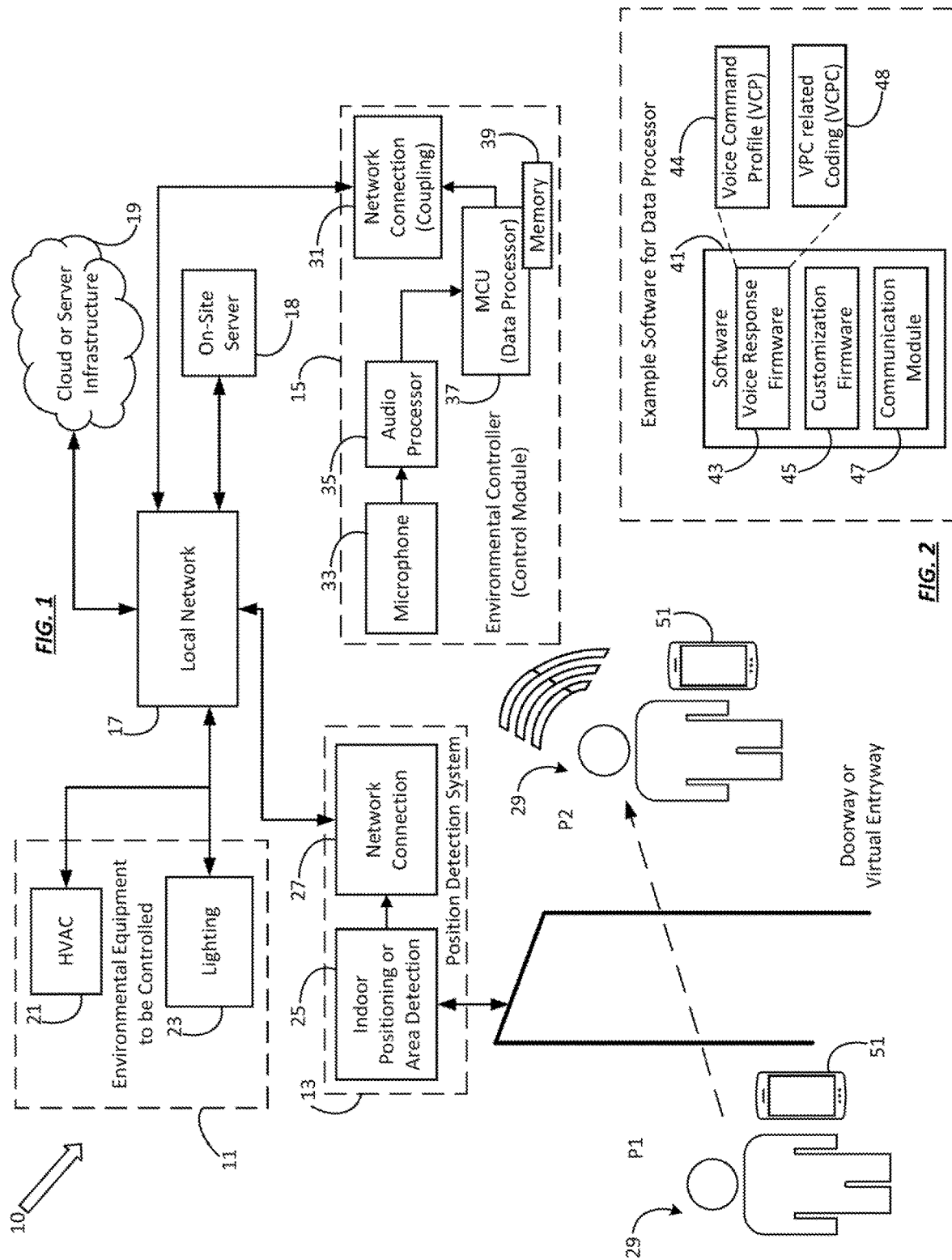

CUSTOMIZABLE EMBEDDED VOCAL COMMAND SETS FOR A LIGHTING AND/OR OTHER ENVIRONMENTAL CONTROLLER

TECHNICAL FIELD

The techniques and equipment relate to embedded voiced response control capability where the programming and/or data for recognizing and implementing vocal commands can be supplemented or modified, for example, to customize the supported command set to an identified user.

BACKGROUND

Electrically powered artificial lighting has become ubiquitous in modern society. Common uses for electrical lighting devices include, for example, in homes, hospitals, buildings of commercial and other enterprise establishments, as well as in various outdoor settings. Traditional light fixtures or luminaires have tended to be relatively dumb, in that the light fixtures or luminaires power ON/OFF, and in some cases dim, usually in response to user activation of a relatively simple input device. Since the advent of electronic light emitters, such as light emitting diodes (LEDs), for general lighting type illumination application, lighting equipment has become increasingly intelligent with incorporation of sensors, programmed controllers and network communication capabilities. Other types of environment controllers may be used to operate or control other types of equipment on the premises. For example, separately or in addition to controlling lighting, environmental controllers may control equipment such as heating, ventilation and air conditioning (HVAC), other building management systems (BMS) services such as access and/or surveillance, or various appliances.

Increasingly, controllers for lighting systems and other systems in the premises have become available that support user command input for lighting or other on-premises environmental control functions. Modern digital assistant type control devices or system rely heavily on network connectivity off-premises to obtain vocal command recognition and responsive control instructions from a cloud based service in real time. This approach requires constant off-premises network connectivity and an on-going subscription with an appropriate cloud service for the real-time processing.

Hence, there are still many installations amenable to vocal command type control using an environmental control device with limited memory and processing capability at the premises that does the vocal command recognition processing locally and generates the appropriate instruction to the controlled equipment in real time, without the cost and delay of accessing a cloud service to handle each spoken input. Such embedded voice control, for example, is well suited for typical lighting control due to the traditionally simple level of control needed (e.g. often just commands for ON, OFF and "dim to" a setting). Such embedded voice control may also be well suited to other types of environmental control applications using small vocal command sets, such as thermostat like control of HVAC equipment, ingress door access control, or the like.

Embedded voice control, however, is static and may be rather limited. The programming and any recognition data (e.g. speech template data) is stored as part of the firmware of the environmental controller as part of the manufacturers' initial set-up and programming procedures and is changed if at all only as part of a complete update of the firmware. For example, the recognizable vocal command set remains constant and is not readily adaptable to the preferences of different people. Also, each person who may use the space served by luminaries or other equipment that respond to the environmental controller need to know of the existence of the voice response control capability and to know the particular vocal commands supported by the firmware embedded in the controller at the particular site. The advanced voice processing capability to respond to variations in the words or other audible utterances used for a command (e.g. just 'lights' instead of the predefined "lights ON" command) are now available via cloud processing services but are not available in an embedded voice command processing environment.

Hence, there is still room for further improvement.

SUMMARY

The example technologies disclosed herein improved embedded voice responsive control by facilitating change of an embedded vocal command set, e.g. to allow customization of supported commands for a particular user.

An example control module includes a coupling for signaling to equipment to be controlled by the module, a microphone and an audio processor coupled to the microphone. A data processor is coupled to the audio processor and to the coupling. The control module includes a memory accessible by the data processor and software in the memory. The software includes voice response software for the data processor, to configure the control module to, without requiring network communication, recognize a first set of vocal commands in response to speech detected via the microphone and the audio processor and issue control signals to the equipment via the coupling corresponding to respective commands of the first set of vocal commands. The software in the memory also includes customization software for the data processor to configure the control module to identify a user in the vicinity of the control module; and based at least in part on identity of the user, change the voice response software. The changed the voice response software configures the control module, to: without requiring network communication, recognize a different second set of vocal commands in response to speech detected via the microphone and the audio processor, and issue control signals to the equipment via the coupling corresponding to respective commands of the second set of vocal commands.

In another example, an article of manufacture includes a machine readable medium and software on the medium, for a data processor of a control module. The software includes voice response software for the data processor, to configure the control module to, without requiring network communication, recognize a first set of vocal commands in response to speech detected via a microphone and an audio processor. Based on such recognition, the control module issues control signals to equipment controlled by the control module corresponding to respective commands of the first set of vocal commands. The software also includes customization software for the data processor. The customization software configures the control module to identify a user in the vicinity of the control module; and, based at least in part on identity of the user, change the voice response software. The software change configures the control module to, without requiring network communication, recognize a different second set of vocal commands in response to speech detected via the microphone and the audio processor. As a result of the software change, the control module is able to issue control signals to the controlled equipment corresponding to respective commands of the second set of vocal commands.

Other technologies disclosed below and in the drawings relate to methods supporting changing or creating the command set recognized for embedded voice control.

One example method involves determining that an identified user has rights to establish a customized vocal command set and forming a voice control profile associated with identification of the user, for the customized vocal command set. For each respective vocal command of the customized set, forming the profile entails receiving an input from the user indicating one or more words defining the respective vocal command, and receiving an input from the user indicating a control function of controllable equipment to be implemented in response to automated detection of audio containing the one or more words defining the respective vocal command. The one or more audible utterances defining the respective vocal command is/are noted in the voice control profile, in association with the indication of the control function. This example method also involves compiling the voice control profile into software-change data for a control module having embedded vocal command recognition capability. Based upon detection of the identified user in the vicinity of the control module, the compiled software-change data is used to set-up voice recognition software in memory of the control module. The resulting voice recognition software configures the embedded vocal command recognition capability of the control module to recognize each respective command of the customized vocal command set noted in the voice control profile, and to issue a control signal to equipment controlled by the control module to implement the control function associated with each respective command of the customized set.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 is a high level, functional block diagram of a system that includes controllable equipment and a control module, e.g. an environmental controller, where the control module supports customization of a vocal command set.

FIG. 2 illustrates a firmware example of software for the data processor of the example control module of FIG. 1.

FIG. 14 is a flow chart representing an example of a procedure for a mobile device or the like to send VCP related coding to a voice responsive control module, e.g. via NFC, BLE or the like.

FIG. 15 is a flow chart representing an example of a procedure for a radio frequency enabled badge or the like to send VCP related coding to a voice responsive control module, e.g. via NFC, BLE or the like.

DETAILED DESCRIPTION

Figure 3:
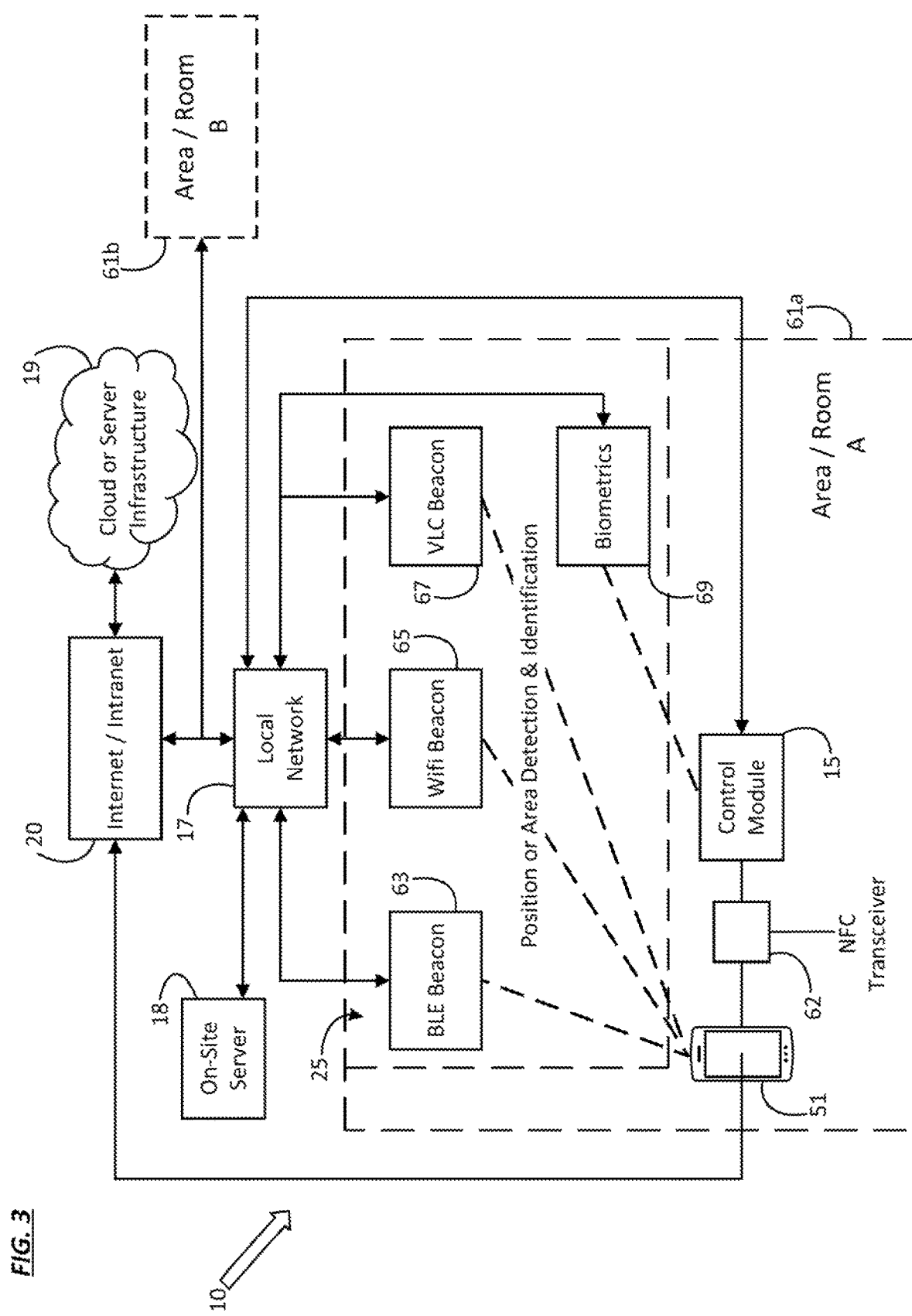
FIG. 3 is an alternate high level, functional block diagram of the system of FIG. 1, showing some of the same elements, omitting some elements for convenience, and showing example elements for position or area detection and/or user identification.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a control module having embedded voice command recognition with the capability to change software or the like that defines the vocal commands that the control module recognizes, based at least in part of identification of a user. Such a control module, for control of lighting or other environmental condition or the like, can recognize a customized vocal command set for a particular user or a member of a particular group. Techniques and systems also are disclosed to allow a user to modify vocal commands or select new vocal commands to develop a customized vocal command set and to compile a corresponding change of voice response software to reconfigure the control module to recognize and appropriately respond to the commands of the customized vocal command set.

With embedded voice control, the control module typically hosts the voice command recognition capability without requiring real time Internet connectivity, e.g. without requiring communication with a cloud based recognition service to perform speech processing. The control module, however, may have Internet connectivity for some other purposes, e.g. reporting, software upgrades, etc. During real-time voice responsive control operations, however, the embedded speech processing to recognize vocal commands and signal corresponding instructions to the controlled equipment is all done locally within the circuitry of the particular control module. If provided, functions for generating any synthesized speech for verbal prompts or providing feedback to the user are similarly implemented locally by the circuitry and/or software of the control module without Internet connectivity.

A vocal command may be defined by one or more audible utterances that are to be recognized and correlated to a responsive control function. An audible utterance, for example, may be vocal speech of one or more words of a known language, although a recognizable word set may include variations from the words of the proper/formal language, for example, slang terms or variations due to differences in local dialects. An audible utterance, however, may be other types of vocal sound, for example, a non-word sound produced by a person's larynx and/or mouth, such as a grunt or a whistle, or a made-up word-like sound that is otherwise meaningless in the particular language (e.g. blurg or zorp).

The examples include several different ways to change active software and thus the recognizable command set as different users enter a space where a condition is controlled by the control module. The software may be updated in response to an input from an identified user, e.g. when the user is assigned to and first enters a specific office or the like. In this first example, the control module would respond to that user's customized vocal command set until changed, e.g. by the same or another user or by a manager. Another approach might automatically change the recognized vocal command set each time another identifiable person enters the vicinity of the control module, to implement the latest recognized person's customized vocal command set. When no identified user/participant is in the space but the space may be occupied by someone else, the control module may use the last identified person's customized vocal command set or return to a default vocal command set.

When there may be multiple users, an issue arises with respect to memory and processing capacity. One approach might be to house all the command possibilities from multiple command sets for all the detected users in a given space at any given time. This may be impractical if memory or processing capability is limited at the control module. To mitigate such issues when serving multiple users, the system can be tuned for prioritization of commands, particularly if the control module does not have the full memory capacity to store all of the sets without harming functionality. For example, if one user's command set involves HVAC controls, but HVAC control is not supported while lighting control is supported, the embedded control module may not load the software for the first user's HVAC related commands and may instead support lighting only commands from another user in the same space to fill the available memory space.

Software broadly encompasses executable program instructions and data that a programmable processor based device utilizes to implement functions defined by the software. Various combinations of program instructions and associated data fall under the broad scope of software. In an example related to vocal command recognition, a programmable device may have an operating system and an application running on the device via the operating system to implement the vocal command recognition. The operating system and application are different layers of the software stack running on the processor of such a device. Firmware is another category of software. Although firmware may provide an operating environment for complex higher layer application programs; for a lower processing capacity device, such as a typical environmental controller or other type of control module, the firmware provides all the programming for the data processing and operational control of device hardware to implement the various functions of the particular device. In an example related to vocal command recognition, a control module that utilizes a micro control unit (MCU) may not utilize an operating system and instead may utilize firmware to implement the various programmed functions of the module including vocal command recognition and programmed responses to detected vocal commands. Most environmental controllers or other types of similar control modules implement embedded vocal command recognition using firmware, although some control modules may utilize other types of software architectures such as an architecture providing an operating system and a vocal command recognition application.

The technologies discussed below encompass implementations of the control module, for example, as a standalone controller or as an integral element of a controlled device (e.g. integrated in a lighting device). The technologies discussed below also encompass systems that interact with the control module to change command sets that are active in the control module, and/or to modify or create a new customized vocal command set. A control module, for example, may include a coupling for signaling to equipment to be controlled by the module, a microphone and an audio processor coupled to the microphone. A data processor is coupled to the audio processor and to the coupling. The control module includes a memory accessible by the data processor and software in the memory. The software includes voice response software for the data processor, to configure the control module to, without requiring network communication, recognize a first set of vocal commands in response to speech detected via the microphone and the audio processor and issue control signals to the equipment via the coupling corresponding to respective commands of the first set of vocal commands. A system may include such a control module as well as the controlled equipment. Such a system may also include a positioning or area detection system, a server and/or cloud services arranged for communication with the control module.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

Reference now is made in detail to the examples illustrated in the accompanying drawings and discussed below. The block diagram of FIG. 1 shows elements of a system 10 for voice responsive control of environmental conditions. Most of the elements of the system 10 are at a premises, such as an enterprise or residential facility, although the elements at the premises may communicate with data processing services/systems outside the premises (relevant examples of which will be described in more detail later). At a high level, the on-premises elements of the system 10 include various pieces of environmental equipment 11 that are intended to be controlled, a position detection system 13, a voice responsive environmental controller 15 serving as the embedded vocal command-responsive control module, and a local network for communication amongst the system components 11, 13 and 15 and possibly to allow communication with other services/systems outside the premises, such as the cloud or server infrastructure 19. At the premises, the system 10 may also include an on-site server 18 coupled for communication via the local network 17, for example, to store identifiers associated with recognized users and possibly storing data defining access rights or privileges for such users.

Examples of controlled equipment 11 include HVAC equipment 21 and lighting equipment 23. Examples of HVAC equipment 21 that may be controlled include furnaces, heat pumps, air compressors for cooling, blowers or other air movers, variable vents or dampers, carbon dioxide extractors and oxygen generators. Examples of lighting equipment 23 that may be controlled include a wide range of different indoor and outdoor light fixtures and other types of luminaires. Examples of controllable lighting equipment 23 may also include variable passive lighting devices, such as windows, skylights or the like having electronically controlled shutter-like capability (e.g. a variable opacity layer in the form of a smart switchable film). The position detection system in the example of FIG. 1 includes an indoor positioning or area detection system 25 and an associated network connection (coupling) 27. The network connection 27 is a suitable device selected to provide communications for the indoor positioning or area detection system 25 via the local network 17.

The indoor positioning or area detection system 25 is one or more devices that can be utilized to detect when a user is in the vicinity of the environmental controller 15 (at position P2), for example, upon entry into a building or room from outside the building or room (from position P1 in the drawing). Depending on system implementation, the indoor positioning or area detection system 25 may also obtain an identifier associated with the user 29 for use in changing software in the environmental controller 15 to support a customized vocal command set. Although system 13 is shown separately from the control module, some elements for position or area detection, such as RF transceivers, may be included in environmental controller 15 and/or other similar control modules at the premises. Examples of technologies for positioning or area detection and methodologies for using such detection and user identification in relation to dynamic changes of voice command sets are discussed in more detail with regard to later examples.

At a high level, the user 29 may be tracked by the detection system 13 as the user moves about the premises. In a position detection system based on a user's mobile device 51, the system may detect any of the wireless identifiers available from the mobile device, e.g. RFID, Bluetooth, WiFi, cellular, or the like. Although a mobile device may be a wearable device, such as a smart watch, a cuff or glove with neural sensors or an EEG responsive headset, most current examples of a mobile devices include smart mobile phones and network tablet devices or communicate via a mobile phone or the like. Hence, for convenience, the drawings show and further discussion of examples will refer to a mobile device in the form factor of a mobile phone like that shown at 51 in FIG. 1. It will be understood, however, that the operations involving such a mobile device 51 may be implemented using other types of mobile devices.

The system 13 typically can pick up one or more such identifiers from a mobile device 51 whether or not the user is registered with the system 10. If the user is registered, then the system 10 may recognize the user 29 based on the received wireless identifier, either as a particular individual occupant of the premises or as a member of a defined group that is associated with the premises. Location of the user is determined as a function of the node or nodes of the system 25 that detected the mobile device identifier. The position detection system 13, for example, may detect the user's mobile device 51 as the user 29 is approaching a particular room (position P1 shown in FIG. 1) and then detect that the user 29 and their mobile device 51 have entered the room served by the environmental controller 15, at which point, the system may recognize that the identified user is in the vicinity of the environmental controller 15 for purposes of detection of and response to the user speaking commands of a currently active vocal command set and/or for changing the software to activate a different customized vocal command set for recognition at the particular controller 15 going forward.

The local network 17 provides data communication capabilities at the premises and for communications from the premises via one or more outside networks (e.g. an Intranet or the Internet, not separately shown). For example, the network 17 provides local communications between the environmental controller 15 and the controlled equipment 11. The network 17 provides local communications for the position detection system 13 and/or server 18 if desired and provides external network access for to the cloud or server infrastructure 19. The local network 17 may use any suitable media and associated protocol(s), including those for wired, fiber or wireless communication. Wireless communication may utilized radio frequency (RF) technologies of light-based technologies. The controlled equipment 11, the position system 13, server 18 and each environmental controller 15 will include one or more network connections (such as the network connection 27 of the position detection system 13 and the network connection 31 of the example environmental controller 15) would take the form of transceivers or interface cards of the like specifically configured for communication via the media and protocol(s) of the local network 17.

The environmental controller 15 in this first example is a standalone control module. The standalone example environmental controller 15 includes a network connection 31 providing a coupling for signaling commands or instructions to equipment 11 that is to be controlled by the control module 15, in this example, through the local network 17. The standalone control module implementation as an environmental controller 15 may be configured as a lighting controller (e.g. wall switch or wall panel or wall controller), as a thermostat or as a multi-function controller for lighting, HVAC, etc.

In other examples, elements of a similar control module may be integrated into one of the pieces of controlled equipment, for example, into a light fixture or into a particular controllable unit of an HVAC system. In examples where the controller is included in an integral device with controlled equipment, the coupling may be an interface for internal communications of the processor to the controlled element, e.g. to the driver of a light source in an integral lighting device.

The environmental controller 15 also includes a microphone 33 and an audio processor 35 coupled to the microphone 33. The audio processor, for example, may be an analog-to-digital (A/D) converter or a combination of an A/D converter with a digital signal processor that is configured, programmed or controlled for optimization for audio frequency processing.

The example environmental controller 15 includes a programmable micro control unit (MCU) 37. As shown in a later drawing, the MCU 37 includes a data processor acting as a central processing unit (CPU) to execute instructions, process data and output resulting processed data. The data processor of the MCU 37 is coupled to the audio processor 35 to process audio data from the audio processor 35. The MCU is shown by way of an example only, and other types of processors or systems of processors may be utilized.

Although the processor of the MCU 37 may be used for other functions of the controller 15, the processor in the MCU 37 is the data processor for purposes of the embedded recognition of commands spoken by a user in the vicinity of the control module 15 and issuing instruction or command signals to the controlled equipment 11. For example the data processor or MCU 37 processes the audio data from the audio processor 35 (in response to audio detected by the microphone 33) and compares the audio data to speech templates or the like for words or other types of audible utterances of the active voice command set. In such an example, based on comparison results, the data processor or MCU 37 determines if detected sounds match any of the defined strings of speech phonemes or the like representing words or other types of audible utterances for commands in the active voice command set; and generates appropriate instructions for signaling to control equipment in an applicable protocol used by the intended piece of equipment to be controlled based on each detected verbal command.

The processor in the MCU 37 may be the host processor in the environmental controller 15 in that it is the highest level processor for vocal command processing and associated control functions in the particular implementation. Other implementations may have a higher level processor acting as a host for other system functions. The data processor for vocal command processing, for example, may be dedicated to such processing and related signaling to the controlled equipment in a particular controller or device integrating a controller that also may include one or more other processors for other processing applications.

Also, although shown separately, the data processor and the audio processor (and other elements of the MCU 37) may be integrated on the same chip as part of a system on a chip (SoC) implementation. Alternatively or in addition, an SoC including the elements of the MCU 37 may also include the circuitry of the network connection, such as the physical later (PHY) receiver and transmitter elements of a wireless transceiver.

The environmental controller 15 also includes a memory 39 that is accessible by the data processor of the MCU 37 and software in the memory 39. Depending on the amount of code and data to be stored and retrieved, the memory 39 may the memory typically included as part of the MCU 37, or the memory 39 may be an external memory coupled to the MCU 37 and thus to the data processor within the MCU.

A control module, such as environmental controller 15, therefore includes a processor for speech based command detection, responsive control instruction signal transmissions and possibly for prompting and/or providing feedback to a user. The example data processor is implemented in an MCU like 37, which is a system on a chip including the processor, memory, peripheral input/output (I/O) interfaces and ports and possible other circuit components such as circuity of a wireless transceiver. The data processor, however, could be implemented by a higher end microprocessor or the like. In either case, the voice processing capability of the control module 15 is embedded and need not rely on real-time processing by a network-provided service or rely on network communications to reach such an outside processing service. In these and other possible processor implementations, the speech processing capabilities are embedded in that they are implemented by the data processor and associated software within the control module 15.

FIG. 2 shows the example of some aspects of the software, stored in the memory 39 (of FIG. 1) that relate to customizing a vocal command set, although it should be understood that the software in memory 39 may include other executable code or data for other functions of the environmental controller 15.

The software architecture conforms to the hardware of the control module 15. In a microprocessor based control module with vocal command recognition, for example, the programmable module may have an operating system and an application running on the device via the operating system to implement the vocal command recognition. The operating system and application are different layers of the software stack run on the microprocessor of such a control module. The example hardware of FIG. 1, however, utilizes the processor in an MCU 37, which typically utilizes a firmware type architecture. For purposes of further illustration and discussion of an example of the software 41 (FIG. 2) includes relevant firmware components. Software 41 may provide an operating environment for complex higher layer application programs. Alternatively, the software 41 may provide all the programming for the data processing and operational control of device hardware to implement the various functions of the particular device, including vocal command recognition and programmed responses to detected vocal commands. The principles disclosed in relation to the example software 41 may be applied to full firmware images for an MCU or to other types of software supporting embedded vocal command recognition and responsive control signaling or the like, including software change functions to change vocal command sets.

Hence, in the example, the software 41 in the example includes voice response firmware 43 for the processor in the MCU 37, as the example of voice response software. The firmware 43 includes executable code for the processor and/or data for processing by the data processor, such as spoken phonemes and/or utterance templates for use in recognizing audio data as vocalizations of commands. For vocal commands that involve some number of words or other types of audible utterances, the firmware 43 also identifies strings of phonemes and/or words for the vocal commands corresponding to each function of equipment 11 controllable by the particular environmental controller 15.

The voice response firmware 43 configures the environmental controller 15 to locally perform the processing to recognize commands that is to say without requiring network communication. Using the voice response firmware 43, the environmental controller 15 can recognize and respond to a first set of vocal commands, in detected speech from the user 29 sensed as sound via the microphone 33 and the audio processor 35. The voice response firmware 43 also enables the environmental controller 15 to issue control signals representing commands or instructions to any of the controlled equipment 11 via the coupling provided by network connection 31 and the local network 17. The signals, for example in the form of digital instructions sent over the network 17, correspond to respective commands of the first set of vocal commands.

The actual recognition functionality for the embedded voice responsive control is relatively agnostic with respect to the voice or speech patterns of different people who may be in the vicinity of the environmental controller 15. The voice response functionality of the control module 15 need not learn and distinguish the speech characteristics of different users. While a selected vocal command set is active in the control module 15, any person in the space can speak the utterance(s) of a command in the active set and the control module 15 will recognize the spoken word(s), identify the relevant command, and generate and send the instruction signal to the controlled equipment 21 or 23.

The software 41 also includes customization firmware 45, as the example of customization software, for the data processor of the MCU 37 to configure the environmental controller 15 to identify a user 29 in the vicinity of the environmental controller 15. The environmental controller 15 may determine identity of the user 29 in a variety of ways, such as voice or facial recognition, RF detection of an identifier of a radio-enabled device of the user (such as the user's mobile phone or an RFID tag on a badge or the like worn by the user), by optical reading of a barcode from a badge or the like worn by the user, etc. In the example of FIG. 1, detection of an RF type identification from the user's mobile device 51 is provided by the indoor positioning and area detection system 25 and some aspects may be supported by user data stored on the server 18. Alternatively, user identification elements may be included in the control module. Other than possibly the microphone and audio processor for voice recognition, elements for identifying the user are omitted from the simple example of the environmental controller 15 in FIG. 1, although later more detailed control module examples show some alternative options for identifying the user via sensors in the control module.

Based at least in part on identity of the user, the customization firmware/software 45 configures the environmental controller 15 to change the voice response firmware 43. The change re-configures the environmental controller 15 to locally perform the processing to recognize a different set of commands that is to say without requiring network communication. Using the firmware 45, the environmental controller 15 can recognize and respond to a second set of vocal commands (different from the first set) in response to speech detected via the microphone 33 and the audio processor 35 and issue control signals to the equipment 11 via the coupling (network connection 31 in this example) corresponding to respective commands of the second set of vocal commands.

Inability to sufficiently identify an occupant in the vicinity of the module as a user may be handled in several ways. For example, the control module may continue to use the software for recognition of the most recently active vocal command set, e.g. that of the last user to be recognized and successfully software to implement her customized vocal command set. If the control module also stores software for a default vocal command set, e.g. a command set established by the manufacturer or by another party at installation, then the control module could activate that software to recognize vocal commands from the default set in response to failure to adequately identify an occupant.

The network 17 and interface connection or coupling 31 are configured for command signaling to controllable lighting equipment 23 or to controllable heating, ventilation and air conditioning (HVAC) equipment 21. The software 41 in the memory 39 configures the data processor of the MCU 37 to issue each control command corresponding to a respective command of an active one of the sets of vocal commands in a lighting control protocol or an HVAC control protocol.

The software 41 for the processor of the environmental controller 15 also includes a communication module 47. The software of communication module 47 in the example includes firmware type programming and configuration data that the processor of the MCU 37 uses to communicate with other system elements such as controlled equipment 11, position detection system 13, on-site server 18 and/or the cloud or server infrastructure 19, via the local network 17. For example, the communication module 47 enables the processor of the control module 15 to signal control instructions over the network 17 in an appropriate protocol to HVAC equipment 21 and/or in an appropriate protocol to lighting equipment 23. As discussed more later, the communication module 47 also enables the data processor of the MCU 35 (and thus the environmental controller 15) to communicate with user equipment such as a mobile device or other user identification devices for example in the indoor positioning or area detection system 25, to obtain a identification of the user 29. The module 47 also enables communication with the server 18 to verify an identified user has appropriate rights to change software to implement a customized vocal command set of the user. Various communications also may be supported by the module 47, in different examples of receiving software-change data with other system elements to implement a software change.

The identity responsive change of voice response software may involve changing software to implement a previously created second/customized vocal command set associated with the user's identification. A number of examples of techniques to implement the software change are described below, and different change techniques may be better suited to different implementations of the memory, processor and vocal command recognition functionality of different control module configurations. In a general example, a control module may receive software-change data. The software-change data, however, may take different forms for different control module configurations. Such software-change data may include textual data, codes identifying command utterances and/or corresponding control functions, reference data such as phoneme or templates for words or other utterances, and/or executable code for the command recognition functionality and/or the associated generation of instructions for controlling equipment.

Several examples develop a voice command profile (VCP) 44 with the phonemes or utterances of the vocal commands for a set correlated to the controllable functions, for example as text entries in a table developed through interaction with a user. The voice command profile is then compiled into software-change data. The software-change data may include the voice command profile 44, e.g. in the text/table format developed through interaction with the user, or parsed or otherwise reformatted for loading into a control module (e.g. converted to codes identifying command utterances in a pre-defined vocabulary of the module and codes identifying control functions or instructions). In other examples, the compiled software-change data may include or take the form of voice command profile coding (VCPC) 48 that may include reference data such as phoneme or utterance templates and/or any executable code a particular module might require in order to recognize the voice command set and generate instructions or other signals to control the equipment. It should be apparent that the compiled software-change data may combine several of the examples and/or may add or take other forms.

The ability to change the voice response software and thus the vocal command set recognized by the environmental controller 15 allows various users to, from time to time, change voice response firmware 43 (example of voice response software) for the processor of the controller 15 so as to recognize each user's associated customized vocal command set. For example, at some time after a first user has been identified and the change has been implemented to apply the customized command set for that first user, the system may identify a second different user in the vicinity of the environmental controller/control module 15. Based at least in part on identity of that other user, the system 10 changes the voice response firmware 43 configure the control module to locally perform the processing to recognize another different set of commands that is to say without requiring network communication. Using the firmware 45, the environmental controller 15 can recognize and respond to a third set of vocal commands (different from the first and second sets) in response to speech detected via the microphone 33 and the audio processor 35 and issue control signals to the equipment 11 via the coupling (network connection 31 in this example) corresponding to respective commands of the third set of vocal commands.

Each change of firmware/software 43, for example, may effectively replace a single previous vocal command set recognized by the embedded functionality of the environmental controller 15 with the newly installed customized vocal command set. Alternatively, the environmental controller 15 may temporarily load and store voice recognition software for an additional command set and switch execution from the software for the first command set to execution of the software for the second command set. As another example, the environmental controller 15 may store software for a default vocal command set as well as software for customized vocal command sets of two or more users and switch to the appropriate software for one of the customized vocal command sets upon identification of the respective user.

Hence, some implementations of the environmental controller 15 may store data enabling the voice response firmware/software 43 to recognize verbal commands of customized command sets for at least two users. When two such users are identified and detected in the vicinity of such a control module 15 concurrently, the customization firmware/software 45 for the data processor of the MCU 37 further configures the control module 15 to select between the users customized vocal commands sets. Selection, for example, may be based on which of the users has higher priority as indicated by a priority list of user identifiers or which user has an identifier at an earlier position in a user queue based on time of entry into the vicinity of the control module. By way of a more detailed example, two people walk into an area, both with their own sets of personas (groupings) and associated vocal command sets. Person 1 has an HVAC and custodial background, but person 2 only has HVAC background. As both users walk into the area, the system loads up software into the control module to implement the command set associated with the HVAC persona, since both users have access to the commands of that set based on their backgrounds/privileges. Control and command change privileges may be based on user input type, such as manual input, EEG input, or voice input. Examples of developing and using a priority list or queue list are described later in more detail.

The software-change data utilized to change voice response firmware/software 45 by execution of the customization firmware/software 45 may be developed for the users and loaded into the memory 39 of the environmental controller 15 in a variety of ways. At a high level, method examples discussed later provide techniques to dynamically augment the embedded commands via an application running on a smart mobile device 51 and/or a cloud service 19 by creating and installing software changes in memory 39, to allow the environmental controller 15 to recognize a new or modified set of voice commands.

It may be helpful to briefly consider an example, e.g. for lighting control. In the example, the environmental controller 15 may be a wall switch, lighting wall controller or a control module integrated in a light fixture. The standalone environmental controller 15 (e.g. configured as a wall controller) signals control instructions to one or more fixtures or the like among the lighting equipment 23 via the local network 17. The lighting version of the controller 15 has embedded voice responsive lighting control capability, using the microphone, 33, audio processor 35 and processing by MCU 37 based on the software 41 as the example software including for vocal command recognition and related control. The programming and/or speech recognition templates for some basic lighting related voice commands are initially configured on the controller 15 via factory installed firmware (initial version of voice response firmware 43 for a default command set) that allows basic voice command functionality, such as ON/OFF, dim up/down, dim to certain level between 0 and 100 and so forth. At a high level, the examples discussed below provide a technique to dynamically augment the embedded commands via an application running on a smart mobile device 51 and/or a cloud service 19 by creating and installing software changes to allow the lighting version of the controller 15 to recognize new or modified verbalized lighting commands customized to one or more specifically identifiable users 29.

If the user has appropriate access rights, based on user identification, the system 10 may allow the user to modify or create a new customized vocal command set associated with the user's identification. A high-level example of such a method might involve determining that an identified user 29 has rights to establish a customized vocal command set, for example, by obtaining an identifier associated with the user 29 from the user's mobile device 51 and comparing that identifier to user identifiers and associated user privileges stored in a database in on-site server 18. If the user 29 has such rights, the method then interacts with the user to form a voice control profile (VCP) associated with identification of the user, for the customized vocal command set. As discussed in more detail later, this VCP may be a new VCP for the user or for the user when at a particular premises or for the user when in the vicinity of a particular environmental controller 15. In other examples, the VCP formation operation may form a new or modified VCP using a prior VCP as the starting point.

For each respective vocal command of the customized set, forming the VCP entails receiving an input from the user indicating one or more utterances defining the respective vocal command, and receiving an input from the user indicating a control function of controllable equipment to be implemented in response to automated detection of audio containing the one or more utterances defining the respective vocal command. For discussion purposes, it is assumed that the user interaction utilizes the user's mobile device 51, although a separate user terminal computer (not shown) could be used, or speech detection and synthesis via a suitable control module while temporarily communicating with the cloud or server infrastructure 19 could be used. In the example using the mobile device 51, prompts or other useful information are displayed and/or output as audio to the user 29, and the user inputs selections as speech via a digital assistant program on the mobile device 29 or by tactile input (e.g. via a touch screen). The user inputs via the mobile device 51 indicate one or more utterances defining each respective vocal command. The user inputs via the mobile device 51 also indicate a control function of controllable equipment to be implemented in response to automated detection of audio containing the one or more utterances defining each respective vocal command.

The interaction via the mobile device 15 between the user and the system may go to the environmental controller 15 or the on-site server. For discussion purposes, it is assumed that the interactions go to/from a cloud service hosted on one or more server computers in the infrastructure 19. The user inputs in such an example therefore are communicated from the mobile device 51 through the Internet or the like to the cloud service. The one or more utterances defining the respective vocal command is/are noted in association with the indication of the control function, in the voice control profile associated with the user's identifier. This example method also involves compiling the voice control profile into software-change data for a control module like 15 having embedded vocal command recognition capability. As noted earlier, for example, the software-change data may include the voice command profile (VCP) 44 and/or the voice command profile coding (VCPC) 48.

Based upon detection of the identified user in the vicinity of the environmental controller 15, the compiled software-change data is used to set-up voice recognition firmware 43 in memory 39 of the environmental controller 15. The resulting voice recognition firmware 43 configures the embedded vocal command recognition capability of the environmental controller 15 to recognize each respective command of the customized vocal command set noted in the voice control profile, and to issue a control signal to equipment 11 controlled by the environmental controller 15 to implement the control function associated with each respective command of the customized set.

In a system 10 having an indoor positioning infrastructure like system 25, part of the interaction is knowledge of a user's location. As a result, the system can virtually place the person in a space to match reality of the user's physical location and offer control(s) or service(s) corresponding to that location. Even if other technology is used, such as NFC communication to a reader in a particular room or control module, customized service can be keyed to knowledge that an identifiable person who may have an associated customized vocal command set is within a given space. Once in a space, the controls system will listen for or prompt the mobile device for an identifier that the system has associated with voice control. The system can prompt the mobile device 51 for software-change data for a vocal command set and/or fallback to a system database in the cloud 19 if the mobile device is that of a previous user.

If there is no identifier on record for the user associated with the voice control service, the system 10 can create one and may allow the new user to develop a customized command set based on the new user's preferences. In situations where there is no voice command set associated with the identifier of the user, the user may be prompted to create one or use the default set if a prompt from the system is ignored or the user decides not to participate. Creating a new vocal command set for a user may involve selecting from a menu of commands; or if supported, creating a new vocal command set may allow a user to write in their own command utterances, e.g. based on one or more word of a recognizable language/vocabulary.

Once a voice command set is chosen, the software in the embedded control module is appropriately adjusted. Depending on the memory configuration of the control module, there are multiple options, such as installation of a configuration file (e.g. in HTML, XML, or the like). Another approach to software alteration may involve reprogramming, for example, by installing new images firmware to memory for some or all of the previously installed firmware.

The system 10, for example, may allow a user to develop or obtain a customized set of voice commands for their use in a location served by control module having dynamically configurable voice command recognition capabilities embedded therein. A customized vocal command set may be personal to an individual user or assigned to a user as a member of a defined group of users. Each user only needs to be aware of the available commands of their own command set or those of their group's command set. Other users or groups of users may have their own vocal command sets. Once defined and stored, the VCP and/or VPCP to implement the command set is available to change active command sets in a control module, e.g. in an environmental controller 15 or the like. Change of the active command set is responsive to system identification of a user, for example, as the user enters the space served by the particular control module.

Dynamic use and/or development of a customized vocal command set in the examples relies on identification of a user. The identification of the user, however, only needs to be sufficient to link the user to a customized vocal command set and/or to allow user access to the related customization service or feature set. For example, a user may be identified by any available technology that provides identification that is sufficiently unique to the person or group with which a command set is associated and/or having rights to modify or create command sets. The identification need not recognize the individual per se (e.g. by name, employee number or social security number); instead, the system may detect an identification code associated with the user (e.g. a wireless ID, or a barcode on a badge or the like) that links the user to a particular customized vocal command set or to a group having an assigned, customized vocal command set. Alternatively or in addition, different levels of identification at an individual or group level may be used for different capabilities, e.g. one level for normal use of a customized vocal command set and another more secure or trusted identification for a user to create or modify a customized vocal command set. In another example, if there is a customized set and a default command set available, or command sets for two or more users, the higher level authentication may timeout, with an expiration (decrease) of time, change of location by the higher level user or lack of use by the higher level user. As a more specific example, a teacher may pre-record a command set based on words or the like included in a scheduled lesson presentation to trigger desired responses (e.g. lighting state changes). This way specific words or commands within the presentation will trigger controls within the area at appropriate times during the presentation. The control module would return to a default command set or to the teacher's typical command set at or after the end of the presentation.

FIG. 3 is an alternate block diagram of the system 10, with some elements such as the controlled equipment omitted for convenience but showing examples of system elements that may be utilized for position or area detection and identification in relation to the dynamic change of customized vocal command sets in somewhat more detail. For example, the control module 15, the local network 17, the on-site server 18, the cloud or server infrastructure 19 and the user's mobile device 51 are essentially the same as the similarly number system elements shown in FIG. 1 and discussed above. The drawing shows an Intranet or the Internet 20 providing communications for the local network 17 to the cloud or server infrastructure 19. The Intranet or the Internet 20 may also provide communications for the mobile device 51 with the cloud or server infrastructure 19.

A number of elements are shown in area or room 61a for use while the user 29 is in that room or area. It should be apparent, however, that similar elements may be deployed in another room or area such as 61b, for use while the user with mobile device 51 is in that room or area. Still other areas of a given premises may be equipped with a control module and controllable equipment and will elements of a system 25 and/or a similar NFC transceiver 62.

A number of examples rely on the user's mobile device 51 to identify the user and determine that a particular user (e.g. having privileges to upload a vocal command set and possible privileges to create or modify a vocal commence set) has entered the space and therefore is in the vicinity of a particular control module 15. A mobile device today typically has several RF transceivers, including one or more cellular transceivers (for different cellular communication standards still in use across the country), a WiFi transceiver and a Bluetooth transceiver. Some mobile devices have additional RF wireless transceivers, such as an NFC transceiver. These transceivers have associated RF identifiers that they send over the air from time to time to identify the mobile device 51 for various communication purposes. Even if a communication session is not established, equipment of the indoor position or area detection system may be able to sense transmission of an identifier by one of the RF transceivers of the user's mobile device 51, to detect entry into the space in the vicinity of a particular control module 15 and for purposes of recognizing a particular known user with privileges to upload software for a customized vocal command set and possibly to modify or create a customized vocal command set for the control module 15.

FIG. 3 shows a network of elements that may be utilized for position or area detection functions and associated identification functions, mainly in the system 25 of FIG. 1. Several of the elements of the position or area detection and identification system 25 communicate with the user's mobile device 51. Such elements in the example include a BLE beacon 63, a WiFi beacon 65 and a visible light communication (VLC) beacon 67. The BLE beacon 63 or the WiFi beacon 65 may be used to pick-up a corresponding identifier of the mobile device 51 for communication to the on-site server 18 and/or to the cloud or server infrastructure 19. Communication from such a beacon 63, 65 in area or room 61a would also include an identifier of area or room 61a and/or would enable identification of area or room 61a based on an identifier of the beacon 63 or 65 and a database record indicating that the beacon 63 or 65 is located in the area or room 61a. Alternatively, the mobile device 51 can receive a beacon identifier from the BLE beacon 63, the WiFi beacon 65 or a visible light communication (VLC) beacon 67 for communication (with an identifier of the mobile device 51) to the on-site server 18 and/or to the cloud or server infrastructure 19. The beacon identifier sent from the mobile device allows determination that the identifiable mobile device 51 is in area or room 61a is located. In these various examples, a combination of an identifier from the mobile device 51 and an identifier of any one of the beacons 63, 65 or 67 is sufficient to identify the user 29, determine that the user 29 is in the area or room 61a and thus in the vicinity of the control module 15, and check records (in server 18 or infrastructure 19) to determine if the identified user has rights or privileges to utilize the customizable vocal command set features of the system 10.

As an alternative or in addition to the system 25, some implementations may utilize near field communication (NFC). The mobile device 51 in the example is NFC enabled, therefore the system 10 includes a compatible NFC transceiver 62 in or coupled to the control module 15. Bringing the mobile device 51 within range of (or 'bumping' the mobile device to) the NFC transceiver 62 enables transfer of information between the mobile device 51 and the control module 15. For example, the control module 15 may read an identifier of the mobile device via such NFC, which the system 10 utilizes to identify the device 51 and thus the user. The fact that the mobile device 51 is within range of the NFC transceiver 62 also serves as an indication that the user and the mobile device 51 are in the vicinity of the particular control module 15. The NFC communication may also support transfer of software-change data from the mobile device 51 (e.g. from internal data storage or obtained by device 51 from the cloud or server infrastructure 19) to the control module 15.

FIG. 3 also shows a biometrics sensor 69 in the system 25 for room area or room 61a. The sensor 69 represents a general class of other types of devices that may detect presence of one or more people in the area or room 61a and may have the capability to capture biometric data about a user for identification purposes, as alternatives to use of a mobile device 51. The biometric sensor 69 may be a camera or the like coupled to the data processor in part for an identification function based on facial or other feature recognition. The biometric sensor 69 may be an element of the position or area detection and identification system, or the biometric sensor 69 may be a sensor integrated into the control module 15.

Returning to the discussion of FIG. 1, when the user 29 enters the vicinity of the environmental controller 15, the system identifies the user 29 and determines if the identified user is recognized for purposes of the customized vocal command set services of the system 10. If not, then the environmental controller 15 only responds to commands of a default vocal command set as currently active on environmental controller 15, e.g. based on the voice response firmware/software 43 installed by the manufacturer. If the system 10 recognizes the user 29 for purposes of the customized vocal command set services of the system 10, the system may offer the particular user one or two or more options. For example, one available option may be to use an existing customized vocal command set associated with that user as an individual or as a member of a group; and another option may be to modify an existing vocal command set or create a new vocal command set based on level of privileges available to the particular identified user. If the particular user has both usage and change/add type access rights, the system may prompt the user which she would like to use at this time, and then the user selects to use the existing profile or make changes or create a new profile. User inputs for this selection could be by spoken command but often will utilize an application running on the user's mobile device 51.

When creating a new customized command set, the example system will prompt the user as to a type of control function and ask what vocal command the user would like to use for the control function. The prompt and response procedure for inputting vocal commands for a new or modified customized vocal command set may be repeated any number of times, for example, until the user has selected one or more utterances as the new user-preferred command for each control function supported by the particular environmental controller 15. In the lighting example, such a command set might include new verbal commands for all available lighting control functions to control lighting equipment 23 in the particular space, and/or new verbal commands for all available air related control functions to control HVAC equipment 21 in or serving the particular space. For example, for a function dim the lights down, the user might prefer to say "it's too bright in here," or a function to turn the output intensity of the lights up, the user might prefer to say "it's too dark in here." As another example for heating and air conditioning, the user might select "it's hot in here" as a verbal command to turn down the temperature set point and select "it's cold in here" as a verbal command to turn up the temperature set point. The prompts and user inputs could be provided to and received from the user via the user's mobile device (e.g. via visual output and touch input, synthesized speech output and speech detection of input, or a combination thereof). Alternatively, the prompts and user inputs could be provided to and received from the user via a speaker (if provided) and the microphone in the environmental controller 15. If implemented through the audio functions of the environmental controller 15, the MCU may communicate with the cloud voice processing service in infrastructure 19 via network 17 and the Internet during the command set customization procedures.

Once creation of such a customized vocal command set is complete, the utterances for the various vocal commands and the association of the commands to the supported control functions are tabulated into a voice control profile (VCP), which is then compiled into software-change data. The software-change data for that command set may be stored in several places. When the software 45 changes the software to implement the new customized vocal command set in the environmental controller 15, the controller 15 receives the software-change data and may store that data locally. The data processor of the controller 15 uses the compiled software-change data to set-up voice recognition firmware/software 43 in memory of the environmental controller 15 to recognize the customized vocal command set and generate the instructions for signaling to the controlled equipment that correspond to the commands of that set.

If memory size is sufficient, software-change data and/or specific software for one or more other command sets may be retained in memory for future reuse. For example the environmental controller 15 may keep the voice response software from the manufacture to selectively provide a default command set and/or retain the change data or actual software for one or more recently used command sets. Any retained software or change data is marked as inactive, while the MCU 37 is using the voice response software for newly created customized vocal command set.

In the example of FIG. 1, the software-change data and/or specific voice response software for the newly created customized vocal command set may also be stored in the cloud service 19 and/or the user's mobile device 51 for future uses such as reloading to the same or a similar environmental controller 15. The record of the newly created voice response software may include a menu or other type of listing of the applicable control functions and the user-selected strings of command utterances the same as or similar to the VCP table, for later presentation to the user. The menu, for example, may be useful if the user returns later and wants to refresh his memory as to the functions and associated selected command utterances. As another example, the menu may be helpful to set up software for another customized vocal command set, e.g. for a location with a different environmental controller supporting at least some of the same controllable functions.

Assuming that an environmental controller and associated controlled equipment at another location support the same control functions as offered via the controller 15 and the equipment 11, software or change-data for the new command set may be uploaded from the mobile device 51 or the cloud service 19 into the controller at the other location, to allow the user to utilize the same vocal commands at the other location. If the environmental controller and associated controlled equipment at the other location offers a sub-set of the functions corresponding to the new vocal command set, the software for the new vocal command set may be parsed and upload or uploaded and parsed by the MCU in the other environmental controller, to match the more limited set of available control functions. The limited software for the vocal command set associated with the limited control functions at the other location are at least stored locally for use in the environmental controller at that other location while the user is at that location. The limited software for the vocal command set associated with the limited control functions at the other location also may be stored as VCP, VCPC, actual software and/or menu or the like for yet another command set of the user, in the user's records in the close service 19 and/or the user's mobile device 51.

There are various ways to change the software for voice recognition in the environmental controller. One example approach involves a reflash of the entire relevant software. This approach essentially replaces voice response firmware example of software 41 with a new version of software 41 supporting the user selected verbal commands of the desired customized command set. The change data sent to the MCU 37 of the environmental controller 15 would include at least a full replacement copy of the voice response firmware 43 and may include a complete revised copy of software 41. With this first approach, the controller eliminates any previously used command set and accepts only the most recently loaded command set until the installed voice response firmware 43 is later replaced with firmware 43 for another command set. On the other hand, this type of change requires the least amount of space in memory, e.g. only enough for the software associated with one command set at any given time.

Another approach, with more processing by the MCU but requiring about the same amount of memory to store the software, might involve identifying those control functions in the new command set with words or other utterances for verbal commands that are different from the utterances for verbal commands of the previously stored software. The MCU would then use software-change data to rewrite only those portions of the existing firmware example of software 43 where the two versions differ, using the respective portions of the software for the new command set to change or replace corresponding portions of the older software. Again, the controller 15 only supports the one command set, matching the latest software changes, until a later software change to support a different customized command set.

If the environmental controller 15 or other similar control module has sufficient memory, the controller might store voice response software for two, three or more different command sets based on some number of software-change data files received at different times. At any given time, only one software for one command set would be active. Change data or actual software for other command sets would be marked as inactive. With this approach, if a control module had memory for voice response software for three command sets, for example, the control module might have an inactive voice response software for a default command set, an inactive voice response software for a most recently used earlier command set and voice response software for an active new command set. When voice response software for a new command set is loaded and becomes active, that latest software upload replaces the voice response software in memory 39 for the most recent previously used command set; and the voice response software for the previously active command set is marked inactive but kept in memory. With voice response software for the three vocal command sets, the control module could switch back and forth between the active customized command set and the inactive customized command set as two identifiable users associated with those command sets take turns using the space in the vicinity of the control module 15. However, if a user that is not identifiable as having an associated command set (and no rights to create a new command set) enters the space in the vicinity of the control module 15, the control module might switch back to the voice response software the default command set.

As noted earlier, there are several techniques that may be used to detect that a user entered a room or space and thus the vicinity of the control module 15 and possibly to transfer software and/or software-change data to a control module 15. For example, the user may have a radio-frequency identification (RFID) tag, for example, embedded in an identification badge that the user wears or a fob or the like that the user carries. RFID tags may utilize near field communication (NFC) technology and protocol, for example, if the tag will be tapped to or brought within some short range (e.g. within about ten inches) of a reader in the room or space. For example, the premises security system may require a user to bring the RFID tag near or into contact with the reader to unlock an entry door, and the identification of the user and their presence in the space may then be used to load a customized vocal command set to a control module in the space and/or to grant a user privileges to modify or create a customized vocal command set. In the example of FIG. 3, and NFC transceiver 62, which may also read RFID tags, may be coupled to or incorporated into the control module 15. Although NFC is used by way of example, RFID tags may use other longer range RF technologies and protocols, such as those of Bluetooth Low Energy (BLE).

If the system has the NFC transceiver 62, the user can 'bump' their NFC enabled mobile device 51 to the transceiver 62 to identify the user based on an identifier provided by the NFC transceiver within the mobile device. The control module may access the on-site server 18 or the cloud or server infrastructure 19 to determine the privileges if any of the particular user corresponding to the NFC provided identifier. For example, if the user has privileges, the cloud or server infrastructure 19 may provide the software for that user's customized command set to the control module 15 for installation and future use. Alternatively, if the user has privileges, the user might 'bump' their NFC enabled mobile device 51 to the transceiver 62 again to trigger a transfer of the software for that user's customized command set via NFC to the control module 15 for installation and future use.

In the NFC example, the control module 15 may communicate via networks 17, 20 with the server 18 and/or the cloud or server infrastructure 19. That communication is only for one or more purposes useful in an operations to activate, upload, create or modify a software for user's customized vocal command set and thus change the set of vocal command to be recognized by the control module for some time going forward. Once the software for the desired customized vocal command set is set-up and active in the control module 15, the voice recognition capability supporting that command set is embedded in the control module 15 and network communication is not necessary. The control module 15 performs the actual detection and recognition of spoken internally (with respect to the control module), without requiring network communication.

In a simple case, for a control module 15 having minimal storage and processing capacity, software for one user's vocal command set is set-up and active for recognition and control at a given time. Using the NFC technique, for example, the control module 15 may utilize the command set 15 set-up by an NFC operation of a first user's mobile device 51 unit another user sets up voice response software for another vocal command set using NFC operation via an RFID enabled badge or the other user's mobile device 51. The command set would remain static until later changed by the same user 29 or by a different user. During that period, if a different person enters the space, that person would be able to use the control module 15 for the space. That other person, however, would need to know and speak the commands of the customized vocal command set selected by the first user 29.

A variant might roll-back to a default command set, for example, in a conference room when the user 29 who selected a command set left the conference room for more than some short time period, e.g. for more than an hour, or in an office when the user 29 is absent and does not return to the office for some extended period, e.g. for more than two weeks. In the office setting, if the control module supports three command sets, the control module would retain the software for the default command set for use as in the earlier example. However, if the office were assigned to another user for a short time (e.g. a day or so) instead of the regular user 29, the control module 15 would transition back to the software for the default command set associated with the regular user upon departure of the short-term occupant of the office. Some of these use case examples may alternatively be implemented by transfers or modification of loaded software at appropriate times from each user's mobile device and/or from the cloud or server infrastructure 19.

Where the control module 15 has larger storage capacity and processing capacity for recognizing more commands, a number of commands sets may be active at the same time for multiple users in the vicinity of the controller. In this example, each user could at least utilize their own command set. To avoid the need to distinguish the voices of the different users, the control module 15 would likely recognize anyone in the space speaking any of the commands to the active vocal command sets. As a result, the multiple users could if they want utilize commands from each other's' command sets.

The NFC transceiver may be incorporated into the control module. One or more of the example position determination or area detection and identification elements may be incorporated in the control module or may be implemented as more of a standalone system as shown by way of example in FIGS. 1 and 3. If included in the control module, some transceivers or sensors may power down when not needed, for example, when an occupancy sensor determines that no one is in the room or has not been in the room for some period of time. In such an example, the extra transceiver(s) or the like in the control module for user detection and identification may power up from time to time for a short interval to check for presence or may power up when an occupancy sensor detects that a person has just entered the room. Alternatively, a 'bump' of a mobile device to the NFC transceiver may trigger various actions, including powering up additional detection system elements in or around the control module to assist in the vocal command set customization or upload operations.

Regardless of detection technique, when the user or identification device (e.g. mobile device or RF tag) corresponds to the software set-up in the control module and active for recognition of a vocal command set associated with the user, the control module normally will just continue to use that software to recognize commands from the active command set. The system may enter a state that allows the identified user to make changes; in which case the system may or may not prompt the user as to whether or not the user wants to make a change. Absent affirmative input from that user, there would be no change. If another user enters the vicinity of the control module and is identified and recognized as having suitable privileges (particular when the first user is absent), the system might prompt the new user to ask if the new user would like to change the active vocal command set in one of the ways otherwise described herein.

If supported, actual software of software-change data for a customized vocal command set created by one person (e.g. an administrator) may be uploaded to all control modules on premises of a particular enterprise.

Where a particular user goes to different locations having embedded voice command functions in one of more control modules, the user may have a different command set (based on different associated software that may be set-up by different change data) for each of the different locations. Alternatively, the user may have a command set with all preferred commands for all possible control functions available at the different locations, and then the command set is parsed down to just the commands needed at each location (corresponding to just those controllable functions available through each control module) for when the user is present at each location.

For different spaces at one enterprise or at different campuses of the enterprise, if control modules can communicate with each other and/or through the infrastructure 19, it may be possible to transfer software or other software-change data for a user's customized vocal command set to various control modules, e.g. as the user moves from room to room at a particular premises or travels from campus to campus. This transfer approach, together with speech based prompt and selection input for command set creation or modification, may be preferable for an enterprise that wants to limit or prohibit use of mobile devices by enterprise personnel, e.g. for security reasons.

The discussion above provided an overview of the system (FIGS. 1 to 3) and discussion of general aspects of the embedded speech command processing and procedures for customizing and implementing vocal command sets for one or more users. That discussion included a general overview of the implementation of the control module as an environmental controller 15. It may be helpful to consider some more specific examples of control module implementations.

Figures 4, 5:
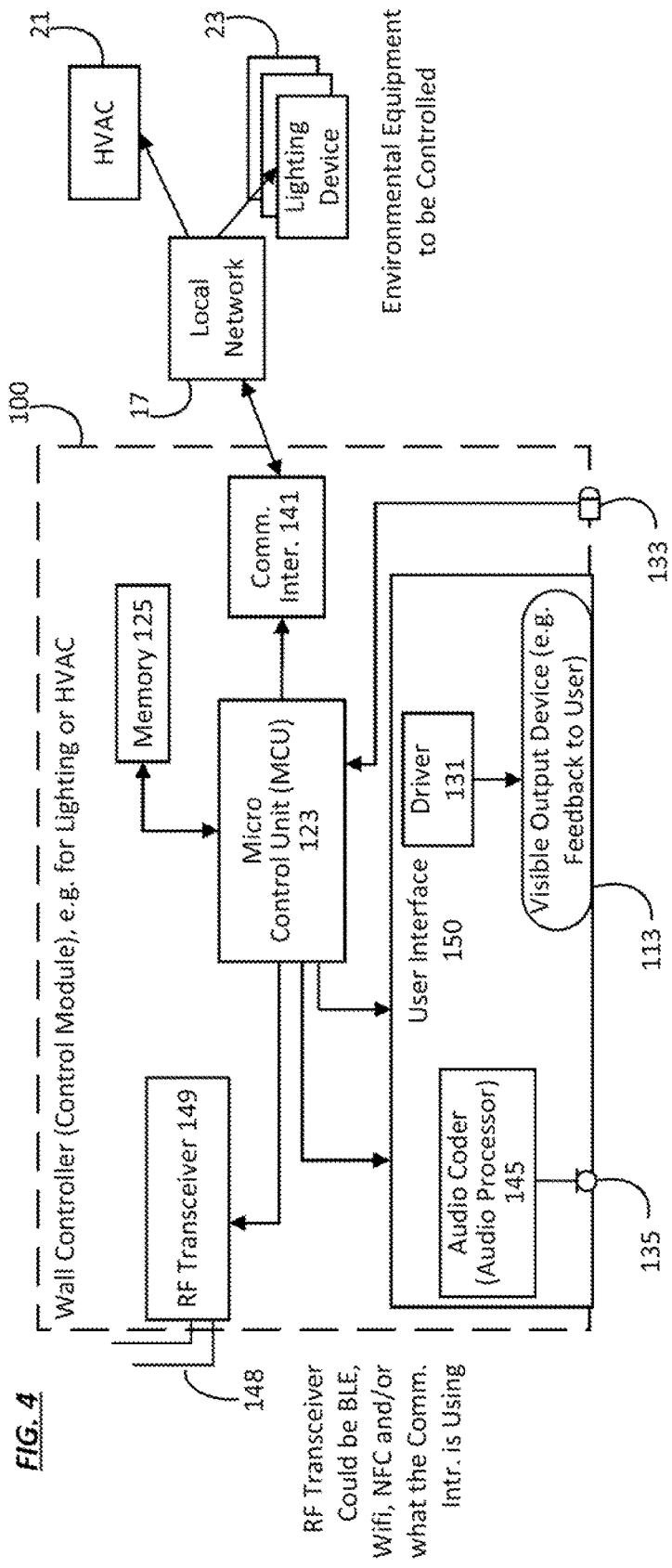
FIG. 4 is a somewhat more detailed functional block diagram of a wall controller implementation of an environmental control module, e.g. for lighting and/or HVAC control.
FIG. 5 is a block diagram of several of the elements of a micro control unit (MCU), such as the MCU of examples of a controller/control module in FIGS. 1 and 4.

For that purpose, FIG. 4 is a somewhat more detailed functional block diagram of a wall controller 100, for example, a standalone implementation of an environmental control module for lighting and/or HVAC control. In the example of FIG. 4, the controller 100 includes a speech-based user interface 150 controlled by a processor. The processor may be a purpose built logic circuit, or the processor may be a microprocessor or other programmable processing circuit for implementing a programmable central processing unit (CPU). In the example, the processor is part of the circuitry of a micro control unit (MCU) 123.

As described in the following example, the wall controller 100 includes the MCU 123 (including the data processor, etc.), a microphone(s) 135, one or more memories as part of or coupled to the MCU 123 for access by the processor of the MCU 123, and a communication interface 141. The wall controller 100 may also include one or more speakers (not shown) for audible output to the user and/or a display or a LED array or the like as shown at 113 for visible output to the user. A driver circuit 131 receives a control signal as an input from the processor 151 of the MCU 123, to generate outputs that are visible to a user in the vicinity of the wall control 100. The speaker or the visible output device 113 may provide outputs to a user such as prompts, menus and feedback indicating processing results, either in response to spoken control commands or inputs from a mobile device or the like, e.g. during a vocal command set software change or during a vocal command set creation or modification procedure. The wall controller 100 also may include one or more sensors, such as a person detection sensor 133.

The data processor in the MCU 123 in the example serves as the programmable central processing unit of the wall controller 100. Although the drawing shows a single MCU 123, for convenience, the wall controller 100 may use a multi-processor architecture. FIG. 5 is a block diagram of several of the elements of a micro control unit (MCU), such as the MCU of examples of a controller/control module in FIGS. 1 and 4. The MCUs in later device examples that use an MCU to provide a data processor and other resources may be implemented in a manner similar to the example of FIG. 5.

With reference to FIG. 5, an MCU like that shown at 123 of FIG. 4 (or 37 in FIG. 1) typically is a microchip device that incorporates the actual data processor circuitry 151 in the form of a central processing unit (CPU) along with various memories, such as main memory 153 and flash memory 155, for storing instructions for execution by the data processor 151 circuitry as well as data having been processed by or to be processed by the circuitry of the data processor 151. The microchip device forming the MCU also includes input/output interfaces (I/O) 157 for suitable connection/communication of the MCU with other system elements, in this case, peripheral elements of the control module 15 or 100.

As shown in FIG. 4, the wall controller 100 may include additional memory 125 coupled to the MCU 123 (e.g. as peripheral through I/O interface 157) and thus accessible to the data processor 151. Typical examples of memories 125 include read only memory (ROM), random access memory (RAM), flash memory, and the like. In the example of FIGS. 4 and 5, the memory or memories store executable programming for the processor 151 of the MCU 123 as well as data for processing by or resulting from processing of the processor 151 of the MCU 123. The circuitry of the data processor 151, the memories and the I/O interfaces of the MCU 27 or 123 typically are all included on a single chip and sometimes referred to as a "system on a chip" or SoC. Although shown separately in FIG. 4, the elements of the MCU 27 or 123 may be incorporated on a chip with the output driver 131 (or a light source driver in a later example) and/or with circuitry of a radio frequency (RF) transceiver 149. The memories 125 and/or 151 and 153, for example, may provide volatile and non-volatile storage; and the program instructions and data stored in the memory memories may include the software 41 of FIG. 2 related to voice responsive control and any related visible feedback via the driver 131 and the visible output device 113.

Returning to the control module implemented as a wall controller 100 in FIG. 4, the wall controller 100 also includes one or more communication interfaces 141. The communication interfaces at least include an interface configured to provide two way data communication for the MCU (and thus for the wall controller 100) via a local data communication network 17. Such a communication coupling supports instruction/command signaling via the local data communication network 17, with lighting devices 23 that may be controlled based on commands detected at the wall controller 100 and/or with HVAC equipment 21 that may be controlled based on commands detected the wall controller 100. In an example like that of FIG. 1, the interface 141 might also provide the communication coupling to communicate with the server 18 and/or to communicate with cloud or server infrastructure 19 offering processing and/or data storage services in support of functions of the customization of embedded vocal command sets.

A wall controller like 100 in the FIG. 4 example may have one or more user input sensors, such as a person detection sensor 133 configured to detect user activity. The person detection sensor 133 may be used for occupancy sensing or people counting. Alternatively, the person sensor may sense biometrics (similar to the sensor 69 shown in FIG. 3), such as a fingerprint or facial feature. In this way, the sensor 133 may assist in identification of a particular user when in the vicinity of the wall controller 100. In that use case, the sensor 133 may be a camera or the like coupled to the data processor in part for an identification function based on facial or other feature recognition. In such an example, the customization software for the data processor further configures the control module 103 to perform the identification of the user by detecting an identifiable feature of the user when in the vicinity of the control module 103 via the sensor 133 and matching of the detected feature to an identification reference associated with the user stored in the memory of the MCU 123.

The wall controller 100 in the example also includes at least one RF transceiver 149 coupled to the data processor in the MCU 123. The transceiver 149 may be the communication interface 141 or an alternate communication interface, for network communications. Alternatively, RF transceiver 149 may be configured and used only for local communications. Examples of the transceiver 149 include an NFC transceiver for communication with a mobile device and/or an RFID tag on a badge or the like, as well as BLE and WiFi transceivers for communication with various types of user operated mobile devices. In any of these examples, the RF transceiver 149 is a type of device that the wall controller 100 can utilize to obtain an identifier associated with a person in the vicinity of the wall controller, in this case, for identifications related to the customized embedded vocal command set functions. For example, the RF transceiver 149 may detect the presence of a mobile phone 51, any other type WiFi enabled user device or BLE enabled user device, or a tag or the like with an RFID or other NFC transceiver, when in the vicinity of the wall controller 100. The RF transceiver 149 also enables sufficient communication with the compatible user device to obtain an identifier of the user device that is associated with the person carrying that user device.

Hence, the customization software (see FIG. 2) for the data processor of the MCU 123 may also configure the lighting controller type control module 100 to perform the identification of the user by obtaining an identifier of a radio-frequency enabled device of the user when in the vicinity of the control module 100 via the radio-frequency transceiver 149. The customization software (see FIG. 2) for the data processor of the MCU 123 may also configure the lighting controller type control module 100 to receive software-change data associated with the identifier via the radio-frequency transceiver 149 and then perform the change of the voice response software based on such received software-change data.

In the example, the user interface 150 implemented in the wall controller 100 includes a microphone 135 and an audio coder (audio processor) 145, for voice input. Although a decoder/driver and speaker may be provided, the example provides visible output via the driver 131 and the visible output device 113. The actual user interface elements, e.g. microphone 135 and visual output device 113, may be in the wall controller 100 or may be outside the wall controller 100 with some other link to the controller 100. If outside the wall controller 100, the link may be a hard media (wire or fiber) or a wireless media.

The example wall controller 100 utilizes the audio coder or processor, as shown at 145 to convert an audio responsive analog signal from the microphone 135 to a digital format and supplies the digital audio to the MCU 123 for processing and/or to a memory 125 for temporary storage. From time to time, the audio input will include speech from a person in the vicinity of the wall controller 100. "Speech" is an analog audio sound that includes spoken/verbal information for human communication. The MCU 123 uses the voice response software 43 (FIG. 2) from any of the memories 125, 153, 155 to determine if any speech included in the audio input corresponds to a command of the active vocal command set. If so, the voice response software 43 enables the data processor 151 to generate a corresponding instruction for a lighting device 23 or HVAC equipment 21, and the communication module enables the MCU 123 to send the instruction in an appropriate protocol over the network 17 (via the communication interface 141).

Functions related to creating or modifying a customized vocal command set and/or setting up the software in the wall controller to implement a customized vocal command set associated with an identified user are implemented using the wall controller 100 essentially as described above with regard to the control module/environmental controller 15 of FIGS. 1 to 3.

As noted, the control module having the embedded vocal recognition and responsive control capabilities may also be implemented as an integral element of a piece of controlled equipment. It may be helpful to consider an example of such an integral control module implementation, e.g. in a lighting device.

Figure 6:
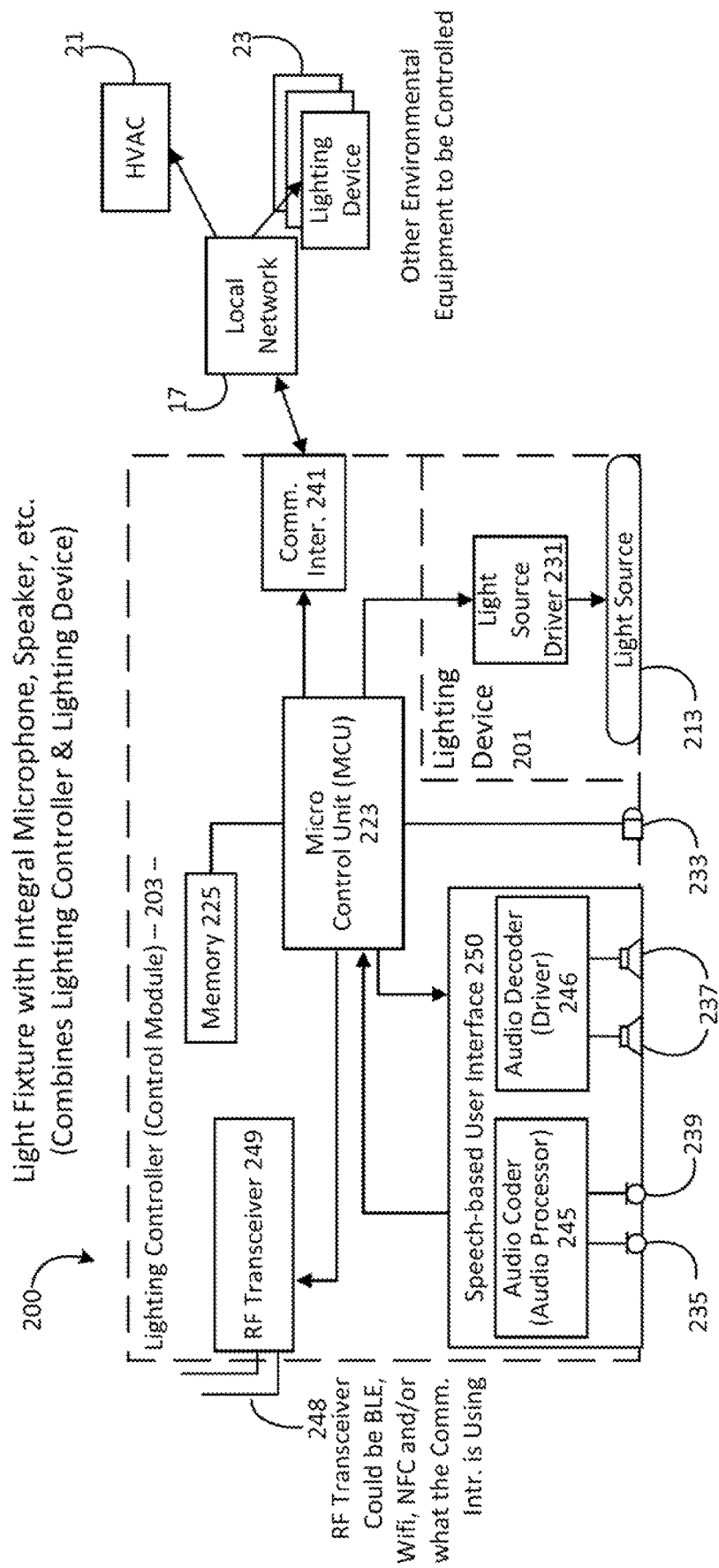
FIG. 6 is functional block diagram of a light fixture including both a lighting device and a voice responsive lighting controller type integral control module.

For that purpose, FIG. 6 is functional block diagram of a light fixture 200 that includes both a lighting device 201 and a voice responsive lighting controller type integral lighting control module as shown at 203. In the example of FIG. 6, the speech-based user interface 250 as well as the lighting device 201 are controlled by a processor. The processor may be a purpose built logic circuit, or the processor may be a microprocessor or other programmable processing circuit for implementing a programmable central processing unit (CPU). In another example, particularly where the source 213 takes the form of a number of LEDs, a system on a chip implementation of the LED driver may include an MCU or the like. In that case, the processor of the driver MCU would perform the main processor functions of the light fixture including the processing related to embedded voice command recognition and attendant control. In the example, the processor and other resources are circuit elements of a micro control unit (MCU) 223, similar to the processor in the MCU 123 in the example of FIGS. 4 and 5.

At a high level, the lighting controller 203 includes the MCU 223, one or more memories 225, a network communication interface 241, an RF transceiver 249 coupled to the data processor in the MCU 223, and optionally one or more sensors, such as a person detection or user feature sensor 233. These elements are similar to corresponding elements of the wall controller of FIG. 4 and perform similar operations.

The lighting device 201 includes a general illumination light source 213 and an associated driver 231. Alternatively, the light source driver 231 may be an element of the lighting controller 203. The MCU 223 controls operation of the light source 213 via a signaling connection to the light source driver 231.

The example lighting device 201 also includes one or more microphone(s) 235, 239 and an audio coder 245. The light fixture 200 may also include one or more speaker(s) 237 and an audio decoder 246. The microphones 235, 239, the associated audio coder 245, the speakers 237 and the associated decoder 246 form the audio user interface 250 in the example, for example for user speech input for vocal command recognition and for synthesized speech output to the user. The light fixture utilizes the microphone 235, 239 as audio inputs (via coder 250), for example, for embedded recognition of verbal commands from a person in the vicinity of the light fixture 200, in much the same was a s the microphone and speaker were used in the wall controller 100 of FIG. 4. The light fixture may utilize the speaker(s) 237 to provide audible output to the user, for example, prompts, menus and feedback indicating processing results, either in response to spoken control commands or inputs from a mobile device or the like, e.g. during a vocal command set software change or during a vocal command set creation or modification procedure. Although shown separately within the lines of the controller 203 of the light fixture 200, the components may be in the same housing as the light engine (device 201) or in a separate housing of the light fixture 200 enclosing components of module 203. The control module of the fixture 200 may be implemented in other ways. For example, a speaker or a microphone or a combination speaker/microphone may be formed by mounting a suitable transducer on a panel of the light fixture to produce and/or respond to audio frequency vibrations of that panel, so that the panel operates as the diaphragm of the audio input and/or output element.

The example light fixture 200 includes the lighting device 201 with the light source 213, e.g. a set of light emitting diodes (LEDs). The source 213 may be in an existing light fixture or other lighting device coupled to the other device components, or the source 213 may be an incorporated source, e.g. as might be used in a new design or installation. The source 213 may be a general illumination light source configured to emit general illumination light for artificially illuminating a space of a premises. For example, the source 213 may be any type of light source that is suitable to the general illumination application (e.g. task lighting, broad area lighting, object or personnel illumination, information luminance, etc.) desired for the space or area in which the particular light fixture 200 is or will be operated. Although the source 213 in the light fixture 200 may be any suitable type of light source, many such devices will utilize the most modern and efficient sources available, such as solid state light sources, e.g. LED type light sources.

Power is supplied to the light source 213 by the light source driver 231 that is configured for the particular type and capacity of the element(s) that make up the general illumination light source 213. The light source driver 231 may be a simple switch controlled by the processor of the device 200, for example, if the source 213 is an incandescent bulb or the like that can be driven directly from the AC current. Alternatively, the diver may be a pulsed or regulated current driver configured to provide current suitable to a number of LEDs in the source 213. Power for the light fixture 200 is provided by a power supply circuit (not shown) which supplies appropriate voltage(s)/current(s) to the source driver 231 to power the light source 213 as well as to the other components of the fixture 200. Although not shown, the light fixture 200 may have or connect to a back-up battery or other back-up power source to supply power for some period of time in the event of an interruption of power from the AC mains.

The source driver circuit 231 receives a control signal as an input from the processor 223 of the device 200, to at least turn the source 213 ON/OFF. Depending on the particular type of source 213 and associated driver 231, the processor input may control other characteristics of the source operation, such as dimming of the light output, pulsing of the light output to/from different intensity levels, color characteristics of the light output, or the like. These functions may be controlled in response to verbal commands from a person in the vicinity of the light fixture 200, as recognized by the embedded vocal command recognition functionality of the lighting controller 203, much like in the earlier examples of standalone control modules.

The communication interface(s) 241 at least include an interface configured to provide two way data communication for the MCU (and thus for the light fixture 200) via a local data communication network 17, with other lighting devices 23 that may be controlled based on commands detected at the fixture 200 and/or with HVAC equipment 21 that may be controlled based on commands detected at the fixture 200. In an example like that of FIG. 1, the interface 241 might also provide the communication coupling to communicate with the server 18 and/or to communicate with cloud or server infrastructure 19 related to the customization of vocal command sets.

The example lighting controller 203 utilizes the audio coder or processor, as shown at 245 to convert an audio responsive analog signal from the microphone 235 or 245 to a digital format and supplies the digital audio to the MCU 223 for processing and/or to a memory 225 for temporary storage. From time to time, the audio input will include speech from a person in the vicinity of the light fixture 200. The MCU 223 uses the voice response software 43 (FIG. 2) from the memory 225 and or 153, 155 of the MCU 223 to determine if any speech included in the audio input corresponds to a command of the active vocal command set. If so, the voice response software 43 enables the data processor 151 to generate a corresponding instruction signal for the light source driver 231 to control the light source 213. The data processor 151 may also generate a corresponding instruction signal for another lighting device 23 or HVAC equipment 21 controlled by the lighting controller 203, and the communication module enables the MCU 123 to send such an additional instruction in an appropriate protocol over the network 17 (via the communication interface 241).

Functions related to creating or modifying a customized vocal command set and/or setting up the software in the wall controller to implement a customized vocal command set associated with an identified user are implemented using the lighting controller 203 essentially as described above with regard to the control module/environmental controller 15 of FIGS. 1 to 3.

As shown by the discussions of FIGS. 1 to 6, a number of the procedures to modify or create a vocal command set and/or to communicate software change date to set-up software in a control module to recognize a user's vocal command set may take advantage of a mobile device 51 owned/carried/operated by a user 29. The various transceivers of the mobile device 51 may provide any of several codes that a system might use to identify the user. Also, the mobile device may provide a user interface during customization and/or installation of a customized vocal command set in a particular control module 15, 100 or 203. Those skilled in hi-tech portable handheld devices will likely be familiar with the overall structure, programming and operation of the various types of such mobile devices. It may be helpful to some readers to understand the general configuration and operation of a mobile device in somewhat more detail. For completeness, FIG. 7 therefore provides functional block diagram of a mobile device as an example of elements of a device a user may carry for vocal command set related operation in the system of FIG. 1. The drawing provides just one non-limiting example of a mobile device architecture. It should be apparent that a mobile device may be constructed or configured in other ways.

Figure 7:
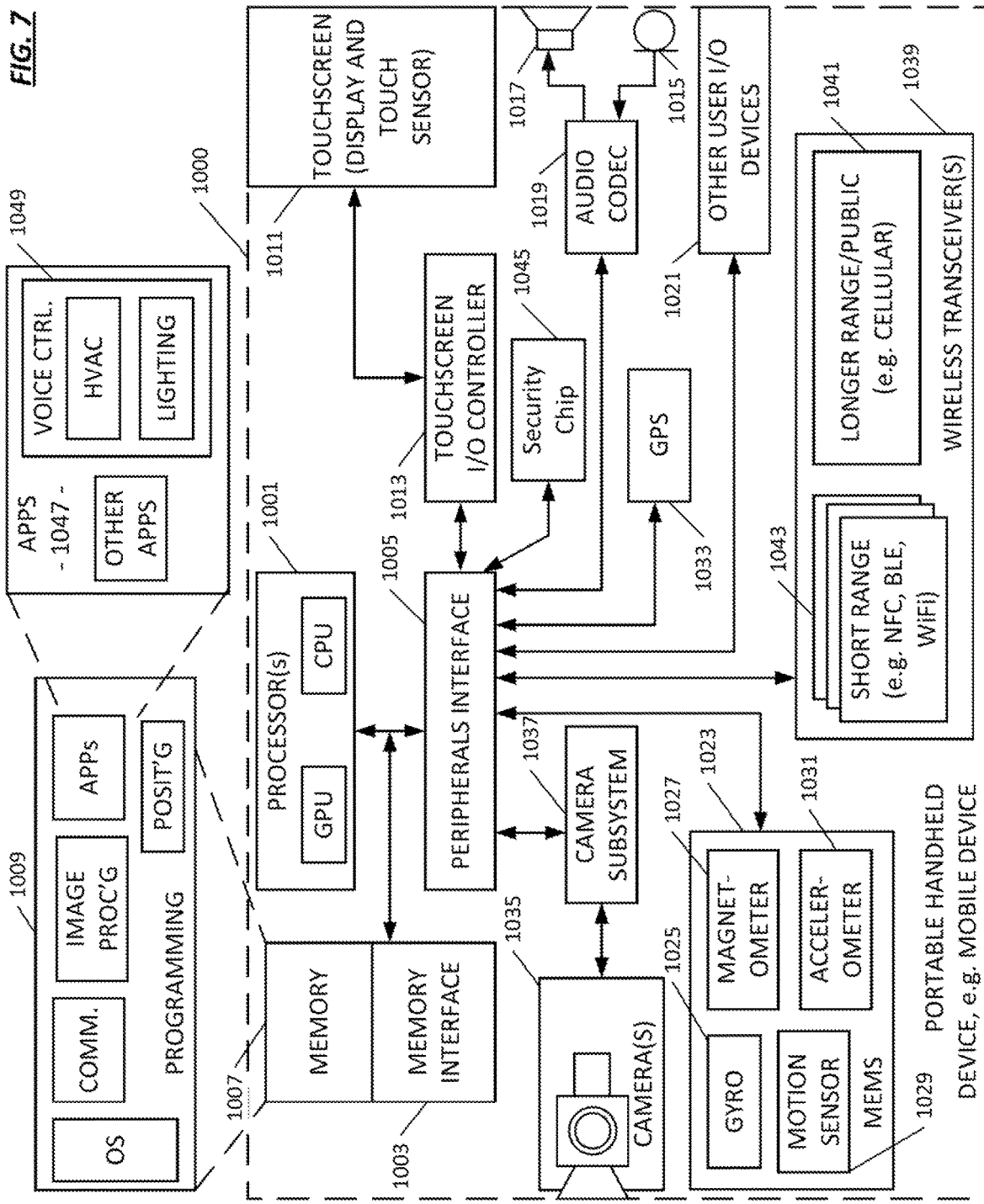
FIG. 7 is functional block diagram of a mobile device as an example of elements of a device a user may carry for identification purposes in the system of FIG. 1.

As shown in FIG. 7 a or "mobile" device 1000 as might take the form of the example mobile phone 51 or a handheld tablet, at a high level, includes one or more wireless transceivers 1039, elements forming an audiovisual user interface for handheld operation, one or more processors 1001, a memory 1007 coupled to be accessible to the processor 1001, and programming 1009 in the memory 1007 for execution by the processor 1001. The mobile device 1000 may include a variety of other components, such as a camera 1035, a processor 1037 coupled to the camera 1035, to control camera operation and to receive image data from the camera, various sensors, a security chip 1045, a wireless positioning signal receiver, or the like. The mobile device 1000 may be any of a variety of modern devices, such as a handheld digital music player, a portable video game or handheld video game controller, etc. In most examples discussed herein, the mobile device may be a smartphone, a wearable smart device (e.g. a watch or glasses, a cuff or glove with neural sensors, or an EEG responsive headset), a tablet computer or the like. With respect to FIG. 7, however, further discussion will focus mainly on a portable handheld implementation with several types of wireless communication capabilities, such as a mobile phone or tablet type device that supports cellular communication (e.g. 4G or 5G), and one, two or more somewhat more localized wireless communication technologies (e.g. WiFi, Bluetooth and/or NFC).

Hence, in the example, the mobile device 1000 includes one or more processors 1001, such as a microprocessor or the like serving as the central processing unit (CPU) or host processor of the device 1000. The example also includes a graphics processing unit (GPU). Other examples of processors that may be included in such a device 1000 include math co-processors, image processors, application processors (APs) and one or more baseband processors (BPs). The various included processors may be implemented as separate circuit components or can be integrated in one or more integrated circuits, e.g. on one or more chips. For ease of further discussion, we will refer to a single processor 1001, although as outlined, such a processor or processor system of the device 1000 may include circuitry of multiple processing devices.

In the example, the mobile device 1000 also includes a memory interface 1003 and a peripherals interface 1005, connected to the processor 1001 for internal access and/or data exchange within the device 1000. These interfaces 1003, 1005 also are interconnected to each other for internal access and/or data exchange within the device 1000. Interconnections can use any convenient data communication technology, e.g. signal lines or one or more data and/or control buses (not separately shown) of suitable types.

In the example, the memory interface 1003 provides the processor 1001 and peripherals coupled to the peripherals interface 1003 storage and/or retrieval access to memory 1007. Although shown as a single hardware circuit for convenience, the memory 1007 may include one, two or more types of memory devices, such as high-speed random access memory (RAM) and/or non-volatile memory, such as read only memory (ROM), flash memory, micro magnetic disk storage devices, etc. As discussed more later, memory 1007 stores programming 1009 for execution by the processor 1001 as well as data to be saved and/or data to be processed by the processor 1001 during execution of instructions included in the programming 1007. New programming can be saved to the memory 1007 by the processor 1001. Data can be retrieved from the memory 1007 by the processor 1001; and data can be saved to the memory 1007 and in some cases retrieved from the memory 1007, by peripherals coupled via the interface 1005.

In the illustrated example of a mobile device architecture, sensors, various input output devices, and the like are coupled to and therefore controllable by the processor 1001 via the peripherals interface 1005. Individual peripheral devices may connect directly to the interface 1005 or connect via an appropriate type of subsystem.

The mobile device 1000 also includes appropriate input/output devices and interface elements. The example offers visual and audible inputs and outputs, as well as other types of inputs.

Although a display together with a keyboard/keypad and/or mouse/touchpad or the like may be used, the illustrated mobile device example 1000 uses a touchscreen 1013 to provide a combined display output to the user of the device 1000 and a tactile user input. The display may be a flat panel display, such as a liquid crystal display (LCD). For touch sensing, the user inputs would include a touch/position sensor, for example, in the form of transparent capacitive electrodes in or overlaid on an appropriate layer of the display panel. At a high level, a touchscreen displays information to a user and can detect occurrence and location of a touch on the area of the display. Tracking touch over time allows sensing of touch gestures. The touch may be an actual touch of the display device with a finger, stylus or other object; although at least some touchscreens can also sense when the object is in close proximity to the screen. Use of a touchscreen 1011 as part of the user interface of the mobile device 1000 enables a user of that device 1000 to logically interact directly with the information presented on the display.

A touchscreen input/output (I/O) controller 1013 is coupled between the peripherals interface 1005 and the touchscreen 1011. The touchscreen I/O controller 1013 processes data received via the peripherals interface 1005 and produces drive signals for the display component of the touchscreen 1011 to cause that display to output visual information, such as images, animations and/or video. The touchscreen I/O controller 1013 also includes the circuitry to drive the touch sensing elements of the touchscreen 1011 and to process the touch sensing signals from those elements of the touchscreen 1011. For example, the circuitry of touchscreen I/O controller 1013 may apply appropriate voltage across capacitive sensing electrodes and process sensing signals from those electrodes to detect occurrence and position of each touch of the touchscreen 1011. The touchscreen I/O controller 1013 provides touch position information to the processor 1001 via the peripherals interface 1005, and the processor 1001 can correlate that information to the information currently displayed via the display component of the touchscreen 1011, to determine the nature of each user input via the touchscreen 1011.

As noted, the mobile device 1000 in our example also offers audio inputs and/or outputs. The audio elements of the device 1000 support audible communication functions for the user as well as providing additional user input/output functions. Hence, in the illustrated example, the mobile device 1000 also includes a microphone 1015, configured to detect audio input activity, as well as an audio output component such as one or more speakers 1017 configured to provide audible information output to the user. Although other interfaces subsystems may be used, the example utilizes an audio coder/decoder (CODEC), as shown at 1019, to interface audio to/from the digital media of the peripherals interface 1005. The CODEC 1019 converts an audio responsive analog signal from the microphone 1015 to a digital format and supplies the digital audio to other element(s) of the mobile device 1000, via the peripherals interface 1005. The CODEC 1019 also receives digitized audio via the peripherals interface 1005 and converts the digitized audio to an analog signal which the CODEC 1019 outputs to drive the speaker 1017. Although not shown, one or more amplifiers may be included in the audio system with the CODEC to amplify the analog signal from the microphone 1015 or the analog signal from the CODEC 1019 that drives the speaker 1017.

Other user input/output (I/O) devices 1021 can be coupled to the peripherals interface 1005 directly or via an appropriate additional subsystem (not shown). Such other user input/output (I/O) devices 1021 may include one or more buttons, a rocker switch, a thumb-wheel, an infrared port, etc. as additional input elements. Examples of one or more buttons that may be present in a mobile device 1000 include a home or escape button, an ON/OFF button, and an up/down button for volume control of the microphone 1015 and/or speaker 1017. Examples of output elements include various light emitters or tactile feedback emitters (e.g. vibrational devices). If provided, functionality of any one or more of the buttons, light emitters or tactile feedback generators may be context sensitive and/or customizable by the user.

The mobile device 1000 in the example also includes one or more Micro ElectroMmagnetic System (MEMS) sensors shown collectively at 1023. Such devices 1023, for example, can perform compass and orientation detection functions and/or provide motion detection. In this example, the elements of the MEMS 1023 coupled to the peripherals interface 1005 directly or via an appropriate additional subsystem (not shown) include a gyroscope (GYRO) 1025 and a magnetometer 1027. The elements of the MEMS 1023 may also include a motion sensor 1029 and/or an accelerometer 1031, e.g. instead of or as a supplement to detection functions of the GYRO 1025.

The mobile device 1000 in the example also includes a global positioning system (GPS) receiver 1033 coupled to the peripherals interface 1005 directly or via an appropriate additional subsystem (not shown). In general, a GPS receiver 1033 receives and processes signals from GPS satellites to obtain data about the positions of satellites in the GPS constellation as well timing measurements for signals received from several (e.g. 3-5) of the satellites, which a processor (e.g. the host processor 1001 or another internal or remote processor in communication therewith) can process to determine the geographic location of the mobile device 1000.

In the example, the mobile device 1000 further includes one or more cameras 1035 as well as camera subsystem 1037 coupled to the peripherals interface 1005. A smartphone or tablet type mobile station often includes a front facing camera and a rear or back facing camera. Some recent designs of mobile stations, however, have featured additional cameras. Although the camera 1035 may use other image sensing technologies, current examples often use a charged coupled device (CCD) or a complementary metal-oxide semiconductor (CMOS) optical sensor. At least some such cameras implement a rolling shutter image capture technique. The camera subsystem 1037 controls the camera operations in response to instructions from the processor 1001; and the camera subsystem 1037 may provide digital signal formatting of images captured by the camera 1035 for communication via the peripherals interface 1005 to the processor 1001 or other elements of the device 1000.

The processor 1001 controls each camera 1035 via the peripherals interface 1005 and the camera subsystem 1037 to perform various image or video capture functions, for example, to take pictures or video clips in response to user inputs. The processor 1001 may also control a camera 1035 via the peripherals interface 1005 and the camera subsystem 1037 to obtain data detectable in a captured image, such as data represented by a code in an image or in visible light communication (VLC) detectable in an image (e.g. from the VLC beacon 67 in FIG. 3). In the data capture case, the camera 1035 and the camera subsystem 1037 supply image data via the peripherals interface 1005 to the processor 1001, and the processor 1001 processes the image data to extract or demodulate data from the captured image(s).

Voice and/or data communication functions are supported by one or more wireless communication transceivers 1039. In the example, the mobile device includes a cellular or other mobile transceiver 1041 for longer range communications via a public mobile wireless communication network. A typical modern device, for example, might include a 5G type transceiver and/or a 4G LTE (long term evolution) type transceiver. Although not shown for convenience, the mobile device 1001 may include additional digital or analog transceivers for alternative wireless communications via a wide area wireless mobile communication network.

Many modern mobile devices also support wireless local communications over one or more other standardized wireless data communication protocols. Hence, in the example, the wireless communication transceivers 1039 also include at least one shorter range wireless transceiver 1043. Typical examples of the wireless transceiver 1043 include various iterations of WiFi (IEEE 802.11) transceivers and Bluetooth (IEEE 802.15) transceivers such as a Bluetooth Low Energy (BLE) transceiver and/or a Near Field Communication (NFC) transceiver for RFID functions or the like, although other or additional types of shorter range transmitters and/or receivers may be included for local communication functions.

Many mobile devices today include a WiFi transceiver, a Bluetooth transceiver and an NFC transceiver. For purposes of the customization of embedded vocal command sets for environmental control modules or the like, one or more such transceivers of the mobile device 1001 support communication with the beacons of the position or area detection and identification system 25 and/or the NFC transceiver 62 (see FIG. 3), or one or more such transceivers of the mobile device 1001 support communication with an appropriate RF transceiver 149 or 249 in an embedded voice responsive control module 100 or 203 (see FIGS. 4 and 6).

The mobile device 1000 in the example also includes a security chip 1045. The security chip 1045 is a dedicated data processor in a secure housing that is relatively tamper-proof (e.g. a dongle). The processor of the security chip 1045 typically performs secure encoding and decoding and related key management functions, in relation to various operations of the mobile device 1000. The security chip 1045 receives instructions and in some cases data for processing from the processor 1001 via the peripherals interface 1005 and returns processing results to the processor 1001 via the peripherals interface 1005.

In some of the software change communications relating to customized vocal command sets, for example, the processor of the security chip 1045 may generate a hash for communication to the control module. In other cases, for example, when receiving software-change data for storage or for relay to a control module, the mobile device 1000 may receive a hash from the cloud or server infrastructure 19. If necessary in such a procedure, the security chip 1045 may perform an appropriate operation to validate the received hash.

As noted earlier, the memory 1007 stores programming 1009 for execution by the processor 1001 as well as data to be saved and/or data to be processed by the processor 1001 during execution of instructions included in the programming 1009. For example, the programming 1007 may include an operating system (OS) and programming for typical functions such as communications (COMM.), image processing (IMAGE PROC'G) and positioning (POSIT'G). Examples of typical operating systems include iOS, Android, BlackBerry OS and Windows for Mobile. The OS also allows the processor 1007 to execute various higher layer applications (APPs) 1047 that use the native operation functions such as communications, image processing and positioning.

Of note for purposes of the present discussion regarding embedded voice control and customizable embedded vocal command sets, the higher layer applications include at least one voice control application 1049. The example represents one such application for both lighting and HVAC related operations. However, separate applications may be provided with respect to different types of equipment and/or similar customizable embedded vocal command set functionalities offered by different vendors or controlled by different entities/enterprises for their different premises. The voice control application 1049 provides the programming for the processor 1001 to control the outputs to the user, process inputs from the user, and for the communications with various elements of the system 10 of FIG. 1, for example, to create or modify a vocal command set, develop the corresponding voice command profile (VCP) and communicate corresponding software-change data to the appropriate control module.

Figure 9:
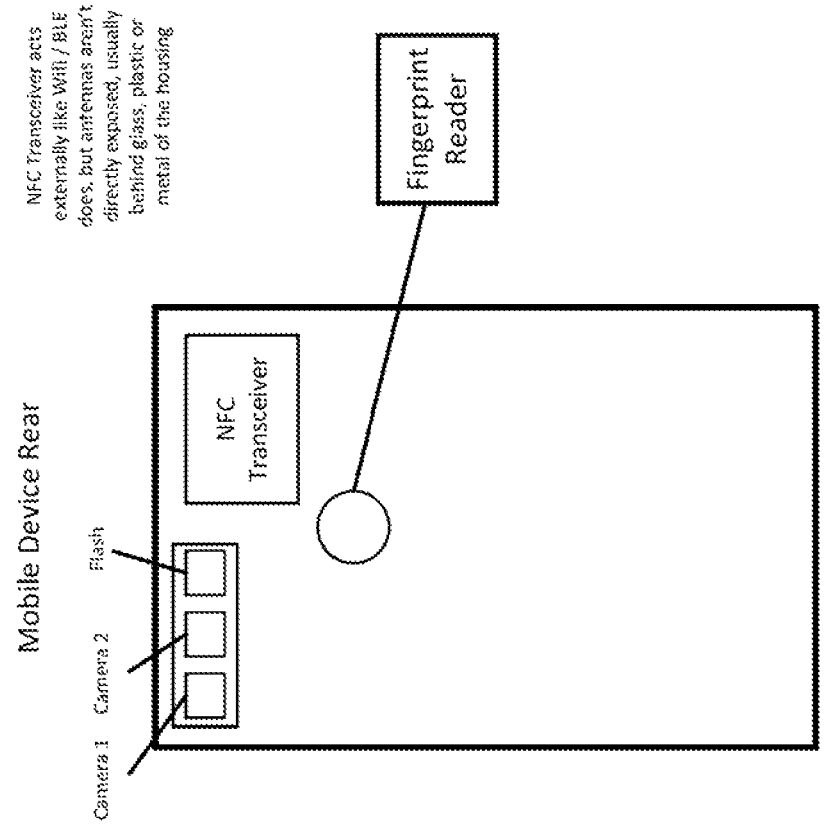
FIG. 9 is a back view, of an example of the mobile device.
Figure 8:
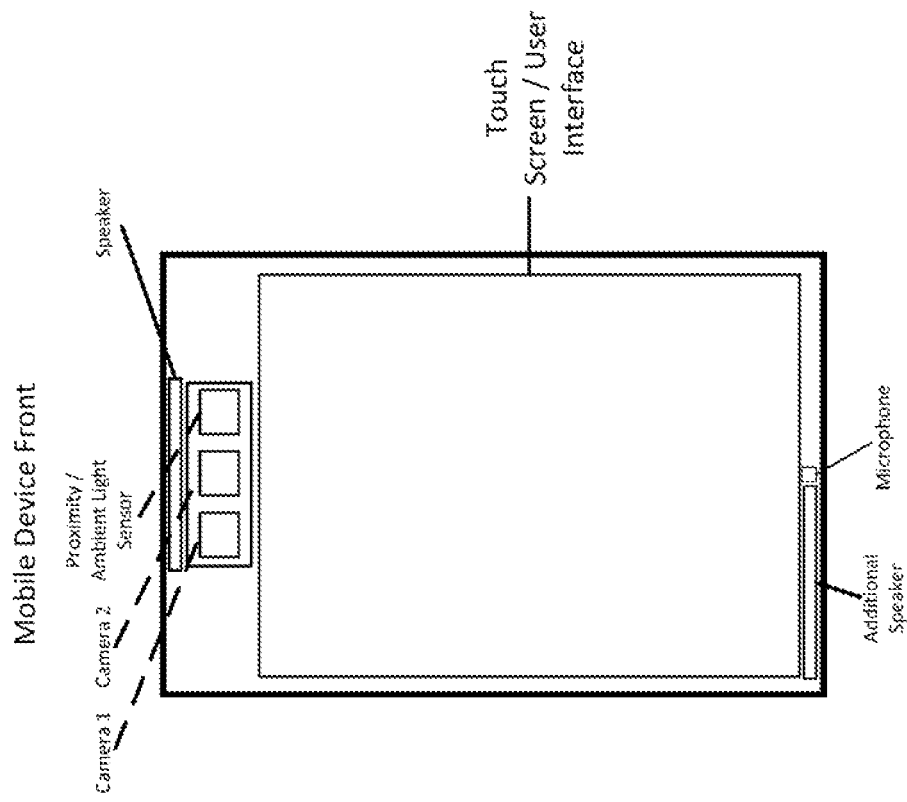
FIG. 8 is a front view.

FIG. 8 is a front view, and FIG. 9 is a back view, of an example of the mobile device. As shown in the front view, the device includes a touchscreen type graphical user input for visual output to the device user and for receiving tactile input from the user. The device includes one or two cameras (two shown near the top) although some mobile devices may include one or more additional cameras. For audio, the example mobile device includes a microphone and a speaker near the bottom of the front panel and another speaker near the top of the front panel. As shown in the rear view, this example mobile device includes two rear facing cameras (although fewer or more cameras may be included) and a flash. Although the NFC transceiver may not be visible, it is associated with a location on the back of the device such as shown in FIG. 9. The mobile device may also include a fingerprint reader, which is shown on the back in the example but may be on the front face (e.g. built into the area or mechanism designated as a 'home' button).

Figure 10A:
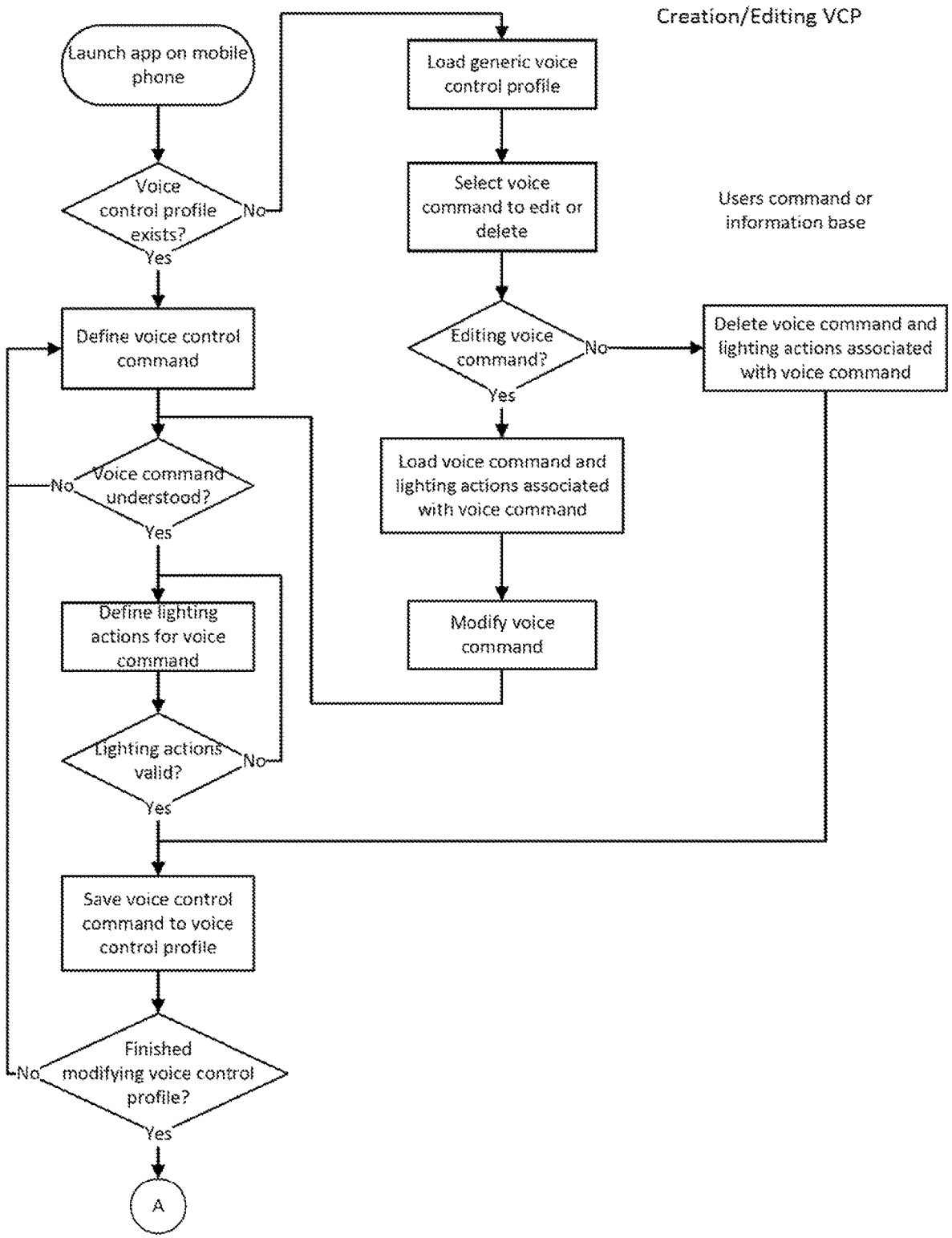
FIGS. 10A and 10B together form a flow chart representing an example of a procedure for creating or editing a vocal command profile defining a customized vocal command set (and thus the associated voice response software).
Figure 10B:
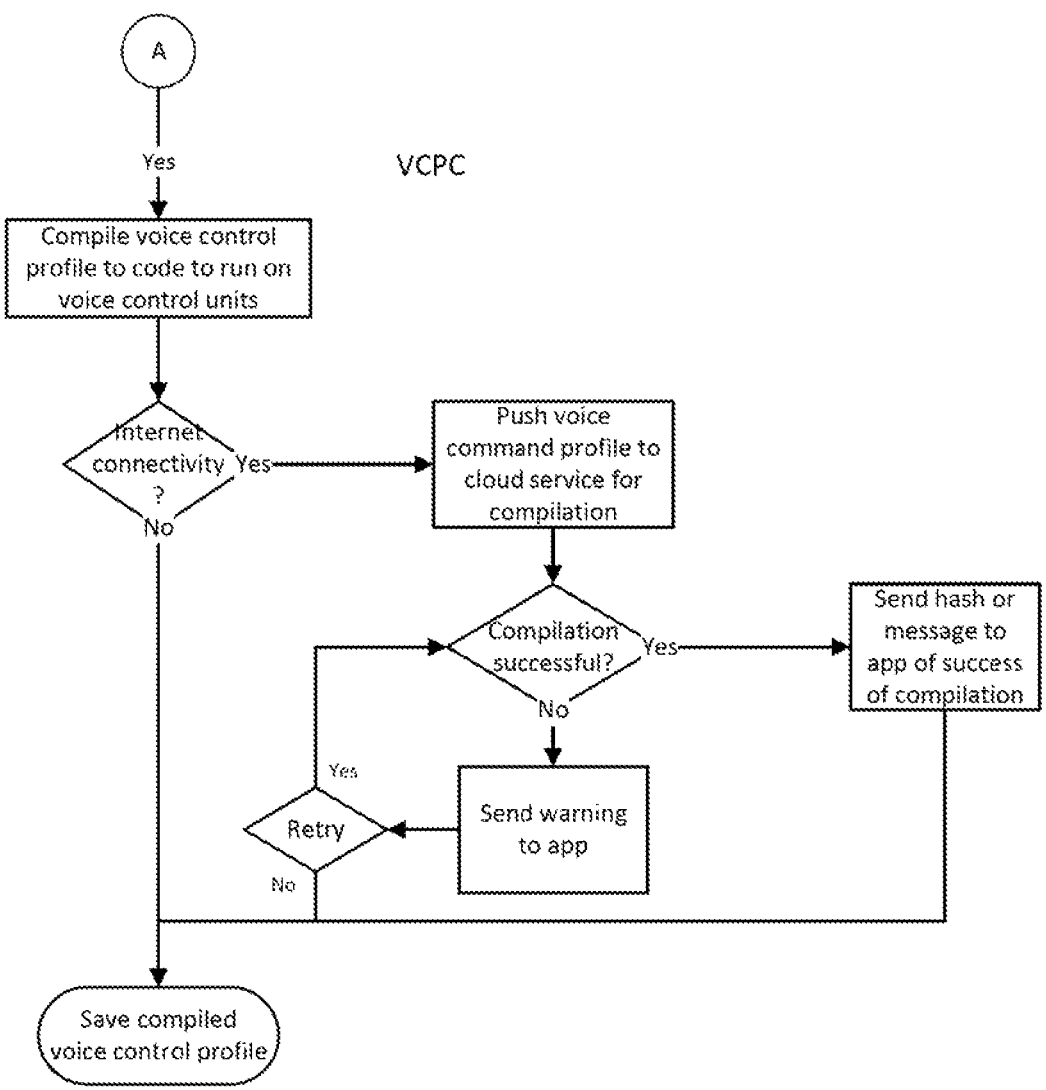

FIGS. 10A and 10B together form a flow chart representing an example of a procedure for creating or editing a vocal command profile defining a customized vocal command set (and thus the associated voice response software). At a high level, FIG. 10A depicts a method for the user to input a pre-defined VCP for the system or create a new VCP for the system. The application prompts the user to launch the application or they themselves launch it, after which the system queries for a VCP. If there is one, the user will be prompted to edit specific commands or choose to do so themselves. If there is none, they will be prompted to create a set of commands for themselves.

As shown in FIG. 10B, after a new VCP is created, the mobile device, cloud infrastructure serviced, of local hub or server will compile the software. If the system has internet connectivity, it will be loaded to the appropriate server as well for universal compilation and later use. A retry will be attempted as a precaution to the system if it fails.

Figure 11:
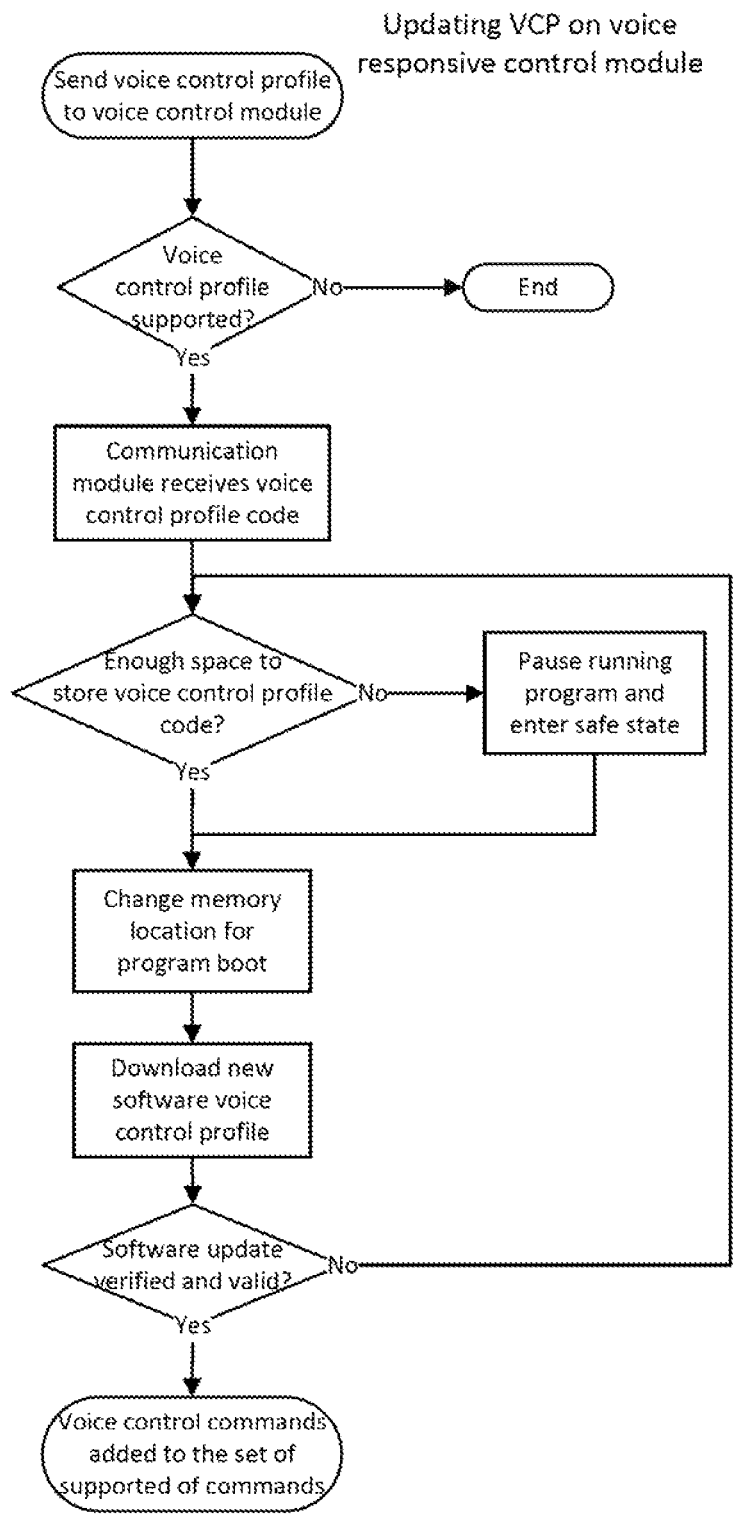
FIG. 11 is a flow chart representing an example of a procedure for updating the voice command profile (VCP) on a voice responsive control module, e.g. to support a new or revised vocal command set.

FIG. 11 is a flow chart representing an example of a procedure for updating the voice command profile (VCP) on a voice responsive control module, e.g. to support a new or revised vocal command set. In this method example, new software is loaded from a cloud service or locally hosted state (mobile device, computer, server, etc.). The software change may utilize a firmware flash update process.

Figure 12:
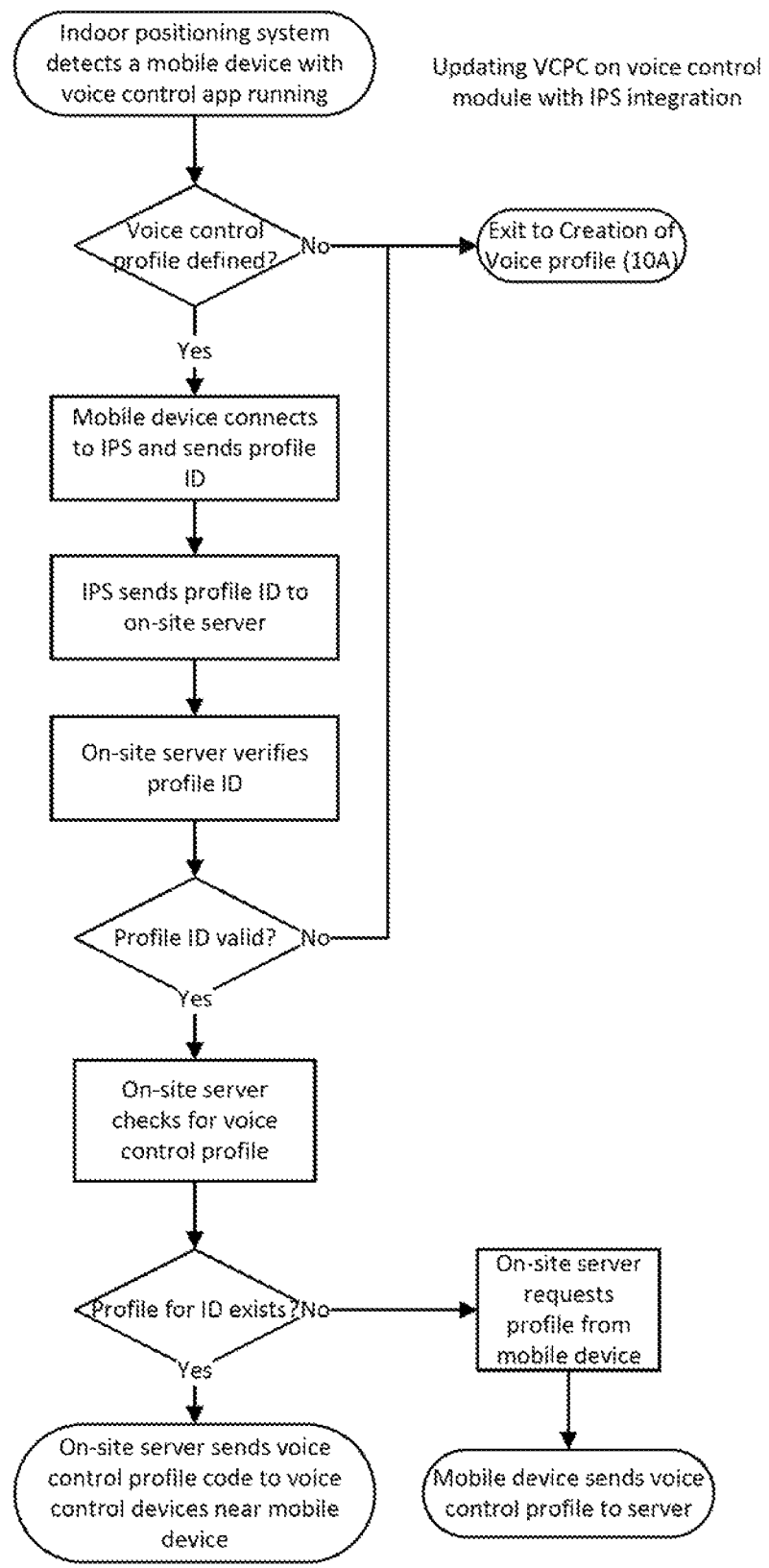
FIG. 12 is a flow chart representing an example of a procedure for updating coding related to a voice command profile on a voice responsive control module, e.g. to support a new or revised command set represented in a new or revised voice responsive profile.

FIG. 12 is a flow chart representing an example of a procedure for updating coding related to a voice command profile on a voice responsive control module, e.g. to support a new or revised command set represented in a new or revised voice responsive profile. There are numerous positioning or detection systems to confirm a person or device is entering an area, for the sake of the flowchart this method is abstracted out. Once a device is detected, it is verified as a positive identifier (ID) for the system and moves along. If not, the process goes towards creation of VCP and adding device/person to the system. If the profile exists, whether on the mobile device, cloud or local server, the processing causes the system to send the VCPC to local instance for installation in the control module. The local instance could be the embedded firmware in a voice responsive control module or storage in a gateway device or local server to barter the installation.

Figure 13:
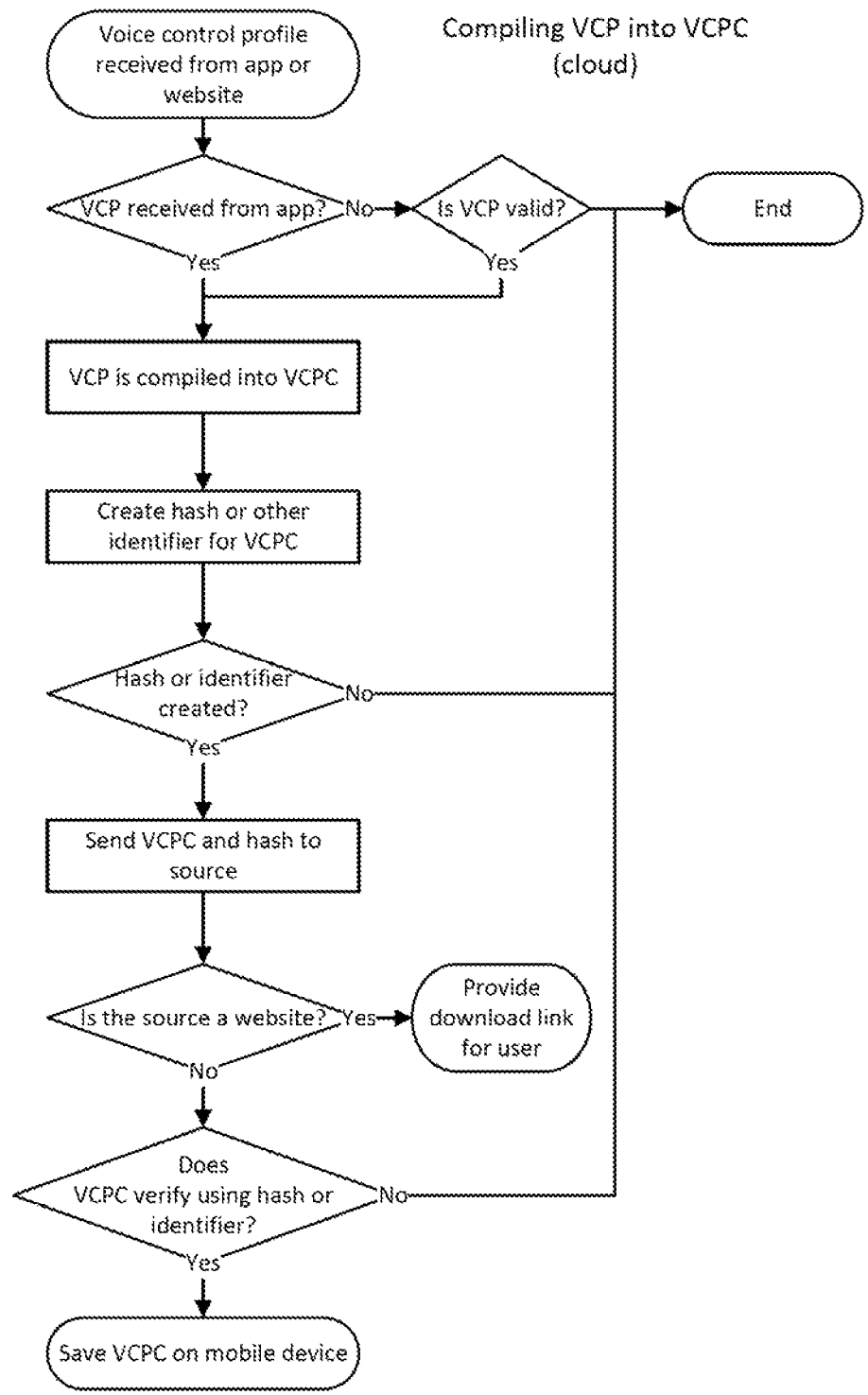
FIG. 13 is a flow chart representing an example of a procedure for compiling a voice command profile (VCP) into corresponding VCP related coding (VCPC).

FIG. 13 is a flow chart representing an example of a procedure for compiling a voice command profile (VCP) into corresponding VCP related coding (VCPC). The example procedure in that flowchart is meant to alleviate situations where the VCP is coming from the cloud as a default (or other user) and sent to the mobile device or local host for later use. The process should not be entirely different from compilation found in FIG. 11, but the illustration in FIG. 13 covers an additional use case for the data's origin. Checks are provided for hashing and proper encryption to verify that the software-change data is a valid code base.

Figure 14:
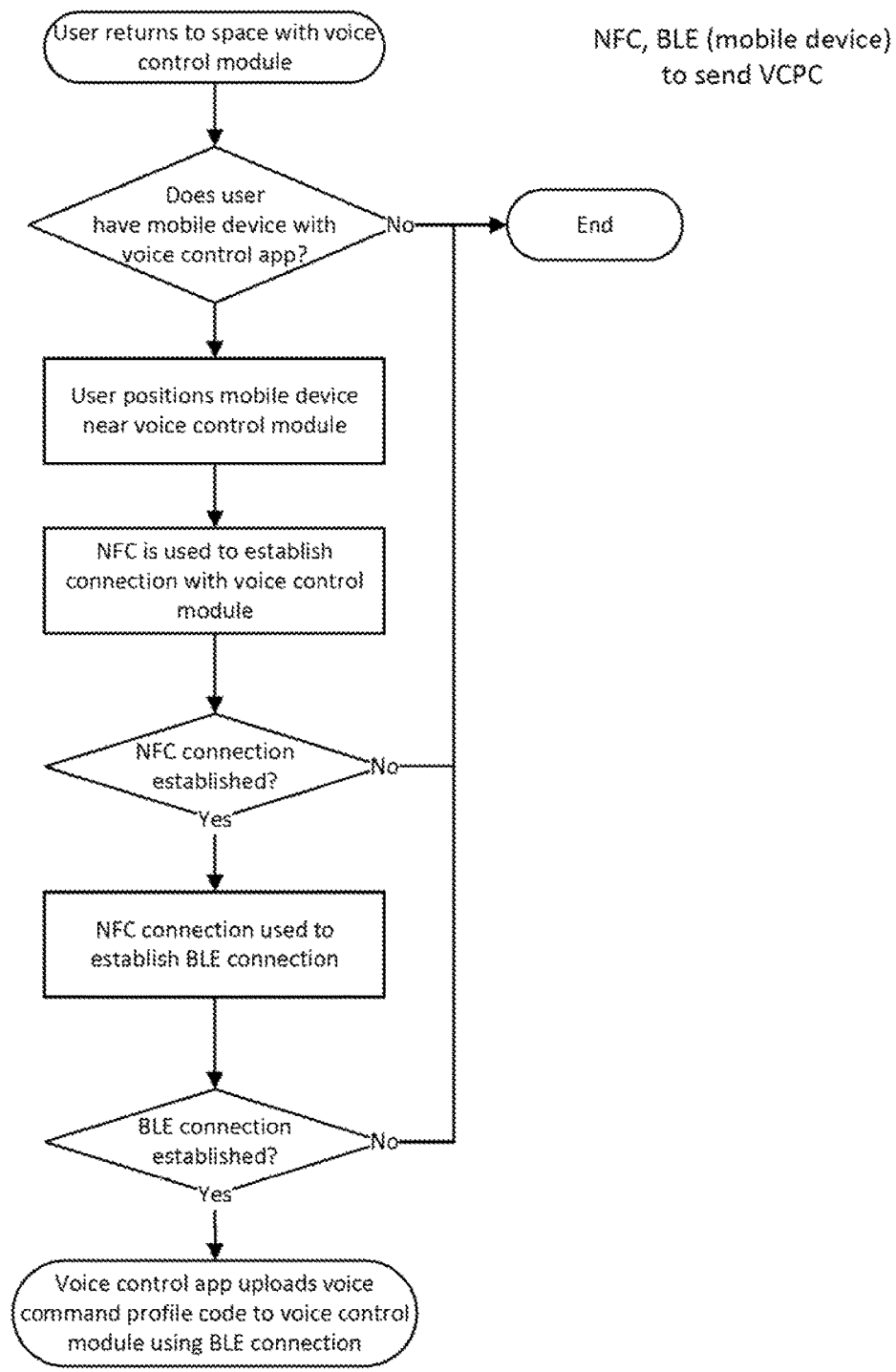

FIG. 14 is a flow chart representing an example of a procedure for a mobile device or the like to send VCP related coding to a voice responsive control module, e.g. via NFC, BLE or the like. The figure illustrates a specific scenario not defined for positioning systems per say. In this situation, the user prompts the query to the system, rather than an automatic detection. This example process uses NFC to create a local BLE (Bluetooth Low Energy) connection for communication with the control module. BLE is then used to upload a VCPC from a mobile device. An alternative might NFC trigger a query to the cloud or server to grab the VCPC, rather than forcing a BLE connection from mobile device to the voice responsive control module. In this alternate scenario, BLE could still be used to confirm a hash, encryption or general success post install.

Figure 15:
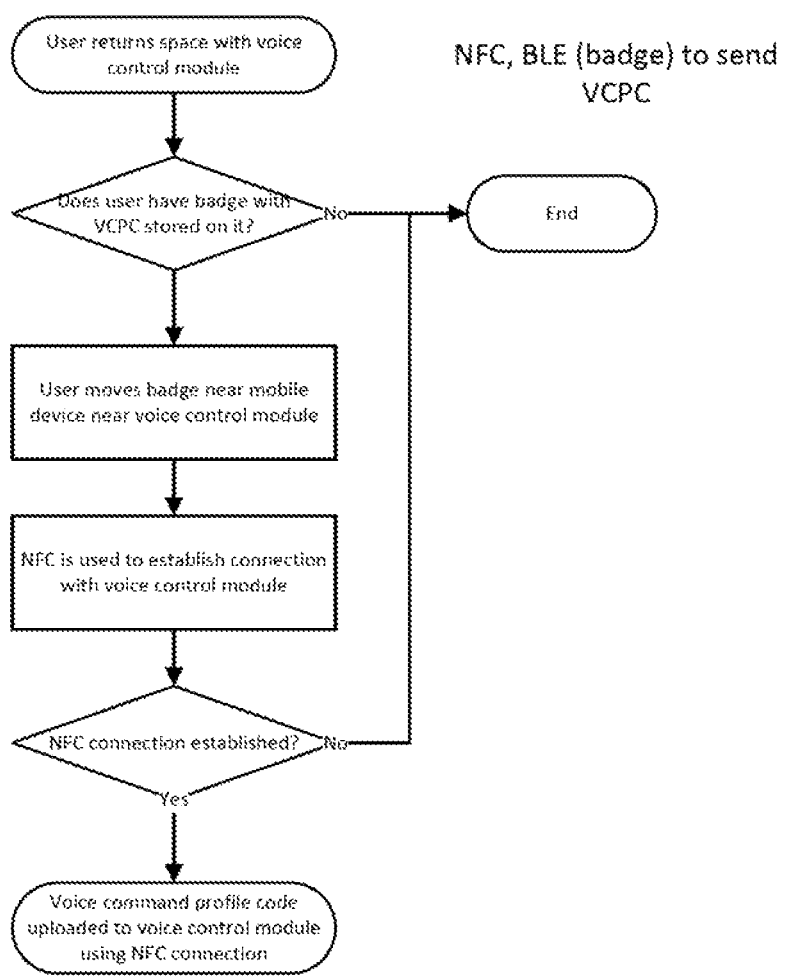

FIG. 15 is a flow chart representing an example of a procedure for a radio frequency enabled badge or the like to send VCP related coding to a voice responsive control module, e.g. via NFC, BLE or the like. This procedures is similar to the scenario described above relative to FIG. 14, except that the process of FIG. 15 uses a badge as an NFC or RFID device and installing the VCPC from another local host or cloud resource. NFC could be used to update the firmware as well, although such an approach may require the user to hold the badge up to the reader in or associated with the control module.

Figure 16A:
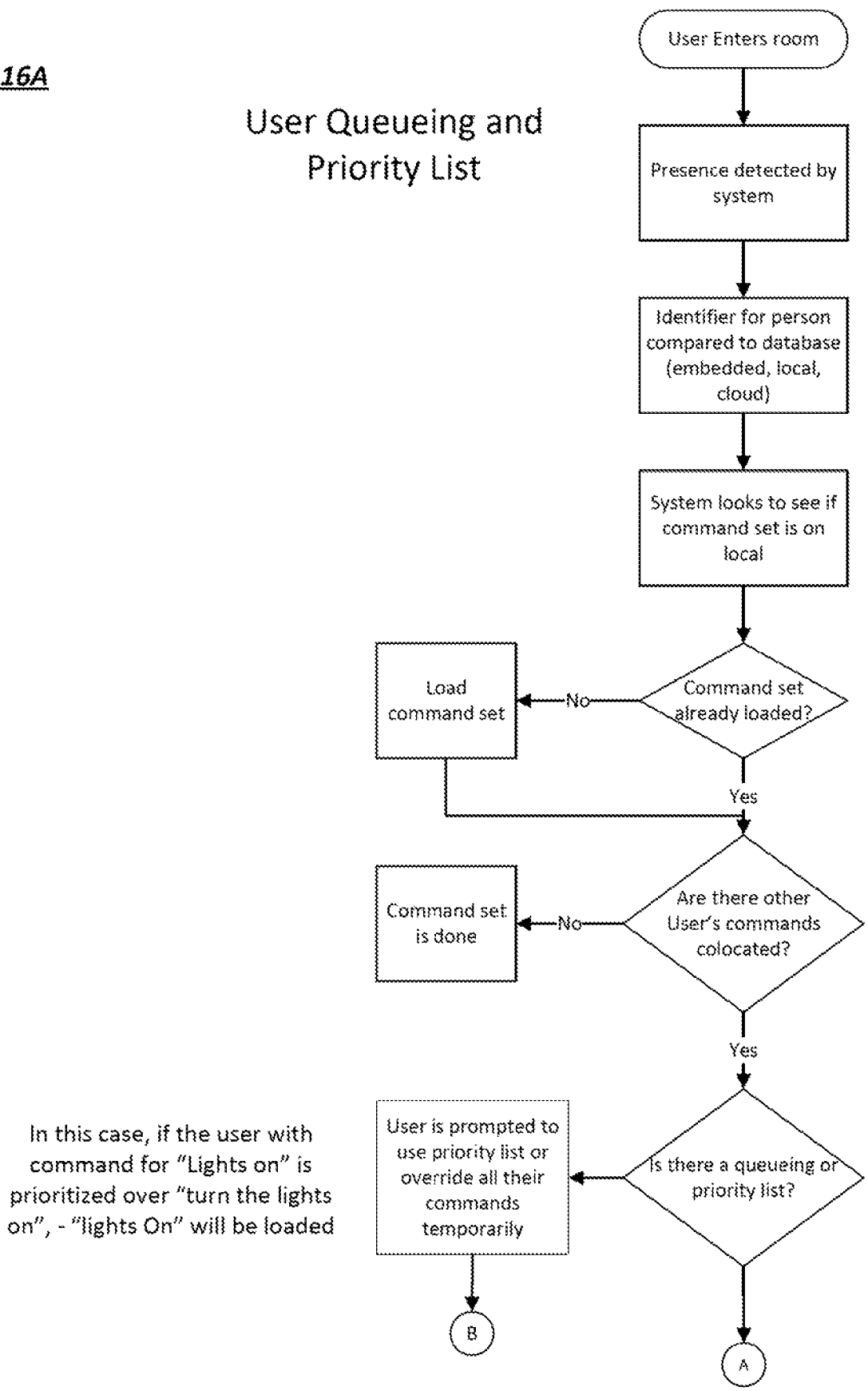
FIGS. 16A and 16B together form a flow chart representing an example of a procedure for handling commands spoken by users having multiple customized command sets through a voice responsive control module, using a queueing and priority list.
Figure 16B:
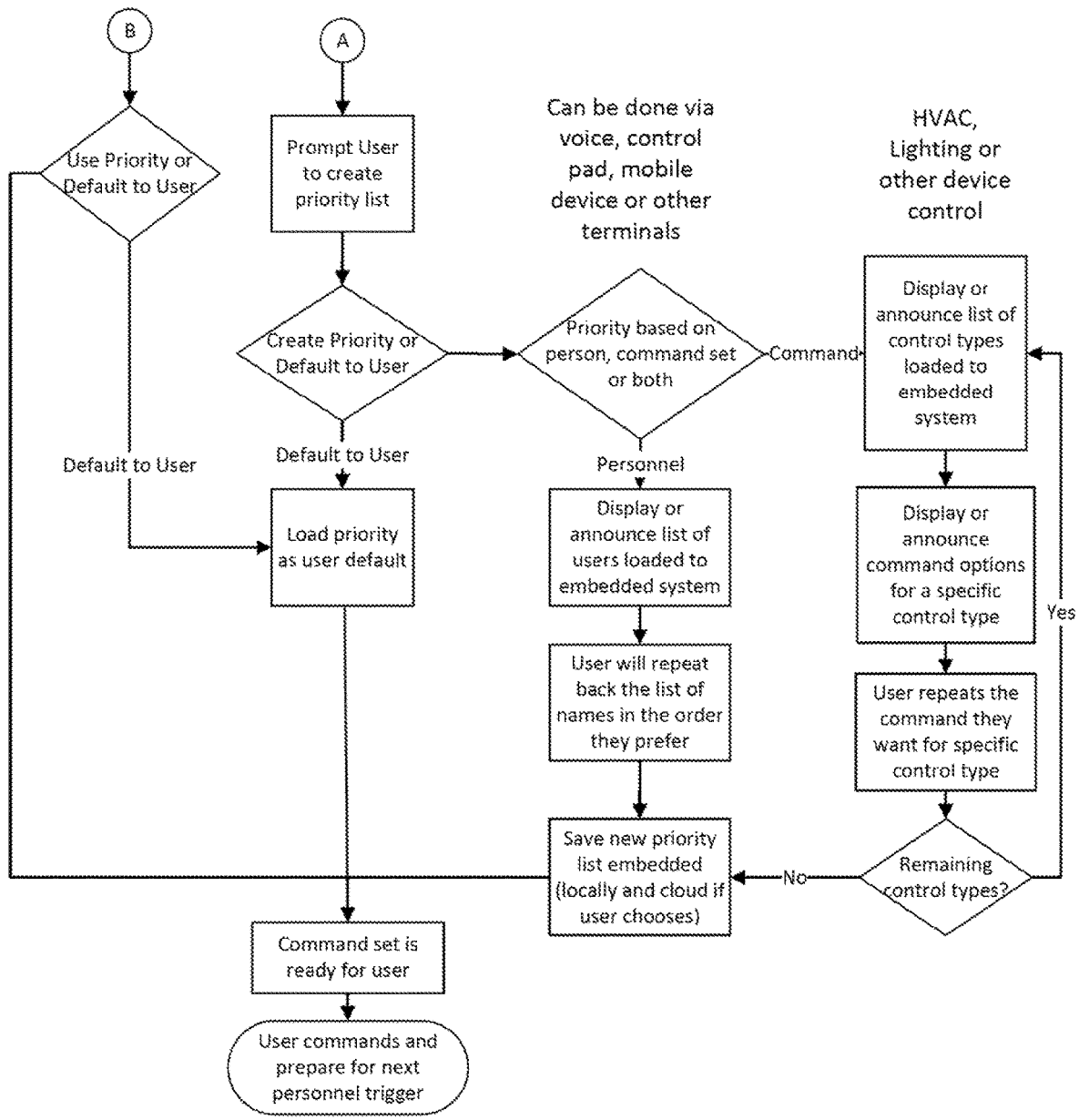

FIGS. 16A and 16B together form a flow chart representing an example of a procedure for handling commands spoken by users having multiple customized command sets through a voice responsive control module, using a queueing and priority list. One goal of the process is to check if there is a voice control profile locally installed before loading a new one. In this process, if the potential new command set is the only command set already loaded (or in the process of loading), there is nothing to be done and the command set takes the lone priority. If there are multiple command sets, the processing splits in two. One processing branch follows a previously defined queuing/priority system or allows the user to create a new queuing/priority system.

The flow chart of FIGS. FIG. 16 an additional part that covers two main scenarios. In one example scenario, the user decides to stick to a default queuing/priority system previously defined for the user; or the user otherwise selects to create a new priority list based on new rules. In the latter case, one of the main rules is focused a personnel priority— either in a default situation (like the president's commands take precedence over those of the vice-president) or a numeric list is made on a per user basis.

The other scenario example is based on command, where the user will be given the list of choices for a specific control—like turning the heat on, and collecting the various choices for the given command set. For example, "Heat On", "Its cold in here" or "I'm freezing" and create a priority list for which will be listened to at this time. Once the user is satisfied with the personnel and/or command priority the system will create a new VCPC if needed or just ignore certain voice prompts lower on the priority list.

The descriptions of the processes flows of FIGS. 10A to 16B are given by way of high level summaries of the illustrated process examples. The flow charts, however, show the logic/flow of such processes in somewhat more detail. It is believed that those skilled in the art are familiar with the programming and general operation of equipment that may be configured to implement such procedures; and as a result, details of the example processes chart should be fairly self-explanatory from the flow charts.

An example of command set creation might utilize an application on the user's mobile device. While active in a creation mode, execution of the application allows the user to input utterances and associate input utterances with various control functions of the module 15, via the user interface offered by the user's mobile device. The application may use the speaker to prompt the user with relevant information and at appropriate times to provide verbal input for recognition of selected utterances (speech input through a recognition feature of the phone and a cloud service associated with the application). In another approach, the mobile device application may use the display of the mobile device to provide image or textual information (e.g. menu of control functions and prompts for word type utterance inputs) and receive word selections of suitable utterances in text form from a virtual keyboard on a touchscreen (or via an actual keyboard if provided by the mobile device). With any such approach, the application will guide the user through a process to select some or all of the control functions supported by the particular control module 15 and controlled equipment 11. When complete, the command set is stored on the mobile device and possibly on a cloud or server based service in the infrastructure 19. Depending on the software design of the control module 15 and the associated change capabilities for that module 15, the software in the module 15 is changed in order to activate the new vocal command set on the embedded voice recognition control module 15.

Actual change of software may utilize any of several different techniques depending on the control module hardware and/or the software architecture. One approach involves a complete reflash of all firmware on the control module with a new version of firmware supporting the new customized vocal command set. Another approach involves changing some code and/or speech recognition templates for any verbal commands in the new set that are different from those of commands in the old set. If memory capacity will support storage of software for multiple command sets, a change may involve uploading software to the module for each new command set that module should support going forward (and possibly, some form of prioritized replacement of software for older command sets).

Several of the examples for firmware changes, e.g. a reflash, are applicable to firmware architectures in which at least the voice response firmware include excitable code or instructions for the processor as well as speech recognition templates for the utterances or strings of utterances for the relevant commands of each customized vocal command set. Such an approach may be advantageous, for example, if the control module 15 only has memory for a limited word vocabulary.

Another approach might involve the control module having a pre-defined vocabulary of word type utterances (fairly large but need not be unlimited). For that vocabulary, the controller would have the speech recognition templates for those words stored in memory, and those templates would not need to change. Also, any code or instructions for voice responsive command recognition would not need to change to support a different command set. Instead, each software load for a customized vocal command set that the module 15 is to support going forward would only specify a string of one or more words as the vocal command to be recognized for each particular controllable function. This later type of approach to change vocal command recognition software could be utilized if the module only supports one command set at any given time, whether changed by replacing the text data for a complete command set of words/strings or just changing the words/strings where a new command set differs from a previously active command set. This type of approach is also applicable to add another command set to one or more command sets available at a particular control module. Such approaches based on merely changing words or word strings simplifies preparation of new software, for example, by reducing or eliminating the need to change executable code or speech recognition templates every time the system makes a software change at the control module 15. Instead, the software change could be embodied in a text in a standard format (e.g. in HTML or XML). The storage of code and/or speech recognition templates for a larger speech word vocabulary, however, may require a larger embedded memory capacity in the control module 15.

A prompt and input operation for command set creation or modification, similar to that with a mobile device and NFC or the like, can be implemented in a location where the user may only have a badge with an RFID or readable bar code, by using a speech response and synthesized speech output to the user via a microphone and speaker in the space in the vicinity of the of the control module 15. The microphone and speaker for such command set creation or modification may be in the control module 15 or some other unit in the space.

As shown by the above discussion, some functions relating to the customization of command sets for embedded voice control may be implemented on computers connected for data communication via the components of a packet data network, operating as an on-site server and/or as a host or server platform for a related cloud service as shown in FIG. 1. Although special purpose devices may be used, such devices also may be implemented using one or more hardware platforms intended to represent a general class of data processing device commonly used to run "server" programming so as to implement the on-site server or cloud service functions discussed above for portions of the customization of the embedded vocal command sets, albeit with an appropriate network connection for data communication with other equipment described above.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities of such computers involve programming, including executable code as well as associated stored data, e.g. files used for the vocal command profiles (VCPs), utterance and/or command lists, templates or the like for use in recognition of spoken phonemes, utterances of multi-word commands, compiled software files, such as the voice command profile related coding (VCPC), etc. The software code is executable by the general-purpose computer that functions as server hosting the cloud service 19 and/or that functions as the on-site server 18. In operation, the code is stored within the general-purpose computer platform, for example, to assist in validating identifications for users and/or to operate as an on-line source of software-change data. At other times, however, the software may be stored at other locations and/or transported for loading into the appropriate general-purpose computer system. Execution of such code by a processor of the computer platform enables the platform to implement the methodology for customizing and distributing software and any related data for the customized vocal command sets, in essentially the manner performed in the implementations discussed and illustrated herein.

Figure 17:
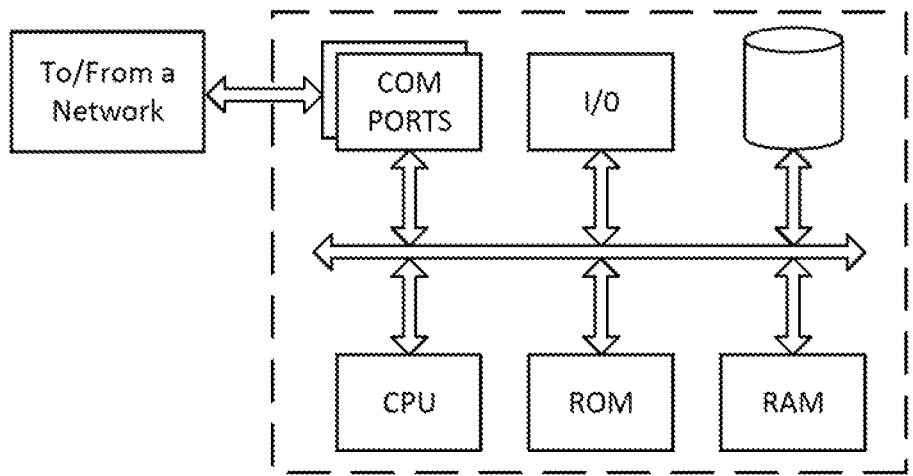
FIG. 17 is a simplified functional block diagram of a computer that may be configured as an on-site server or configured as a host or server, for example, to function as a hardware platform for a cloud service, e.g. as an on-line software source and/or for identification verification.
Figure 18:
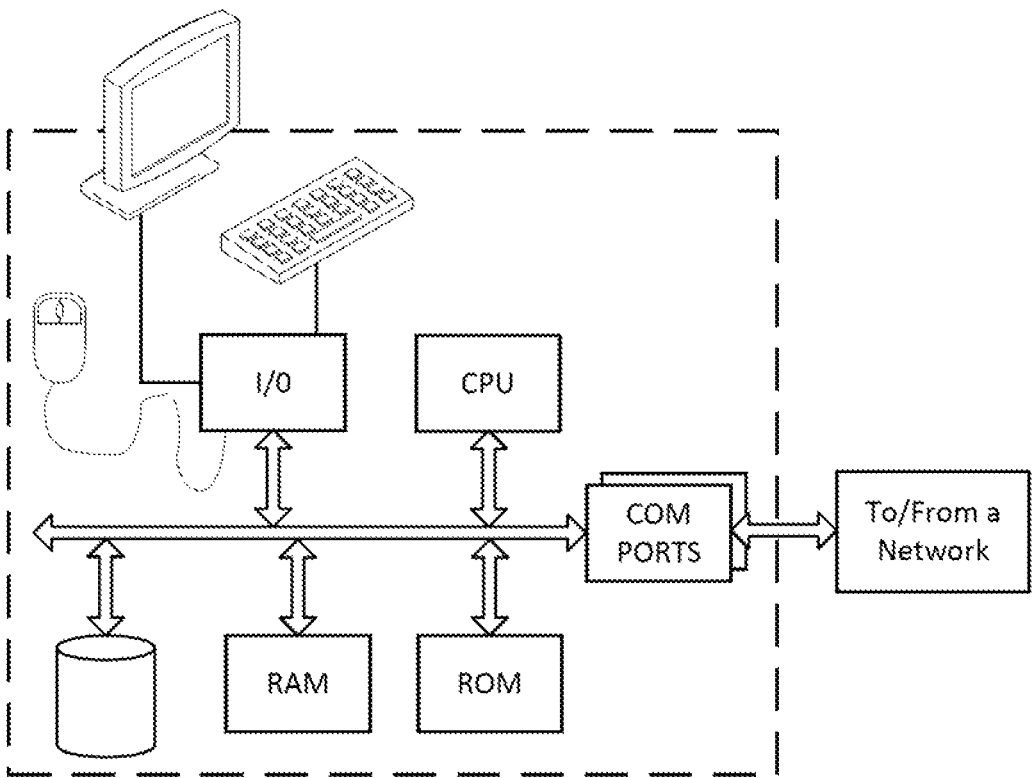
FIG. 18 is a simplified functional block diagram of a personal computer or other work station or terminal device, which may be another example of an on-line software source.

FIGS. 16 and 17 provide functional block diagram illustrations of general purpose computer hardware platforms. FIG. 16 illustrates a network or host computer platform, as may typically be used to implement a server. FIG. 17 depicts a computer with user interface elements, as may be used to implement a personal computer or other type of work station or terminal device (possibly for use as an alternative to a mobile device in some examples), although the computer of FIG. 17 may also act as a server if appropriately programmed. It is believed that those skilled in the art are familiar with the structure, programming and general operation of such computer equipment and as a result the drawings should be self-explanatory.

A server type network connected computer platform, for example (FIG. 16), includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar hardware platforms, particularly to host the cloud service, to distribute the processing load.

A computer type user terminal device, such as a PC or tablet computer, similarly includes a data communication interface CPU, main memory and one or more mass storage devices for storing user data and the various executable programs (see FIG. 17). A mobile device type user terminal may include similar elements, but will typically use smaller components that also require less power, to facilitate implementation in a portable form factor (see also discussion of FIG. 7). The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of customization of an embedded vocal command set and change from one such command set to another in a control module, as outlined above, may be embodied in programming, for example, for the control module, for a mobile device or other user terminal, a cloud service and/or an on-site server. Programming for the control module takes the form of software in the control module, whereas programming for other programmable equipment may take the form of software. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the executable code and data of the programming. All or portions of the programming may at times be communicated through the Internet or various other telecommunication networks. Such communications, for example, may enable loading of software (e.g. a suitable application) from one computer or processor into another, such as, from the server computer hosting the cloud service to a mobile device. Another programming communication example described earlier involves loading of software from a computer or mobile device to a control module. Thus, another type of media that may bear the programming elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the programming. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the command set customization and distribution of software, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

An example of such an article of manufacture includes a machine readable medium and software 41 on the medium, for a data processor 151 of a control module 15, 100 or 203. The software 41 includes voice response software 43 for the data processor, to configure the control module to, without requiring network communication, recognize a first set of vocal commands in response to speech detected via a microphone 33, 135 or 235, 239 and an audio processor 35, 145 or 245. Based on such recognition, the control module issues control signals to equipment 11, 21, 23 controlled by the control module corresponding to respective commands of the first set of vocal commands. The software 41 also includes customization software 43 for the data processor. The customization software configure the control module to identify a user 29 in the vicinity of the control module; and, based at least in part on identity of the user, change the voice response software. The software change configures the control module to, without requiring network communication, recognize a different second set of vocal commands in response to speech detected via the microphone and the audio processor. As a result of the software change, the control module is able to issue control signals to the controlled equipment corresponding to respective commands of the second set of vocal commands.

The drawings and above discussed techniques represent just some examples of equipment and ways to implement embedded voice responsive control with customizable command sets. It should be appreciated, however, that the vocal command set modification technologies admit of a range of modifications and alternate control applications.

For example, identification examples above often identified a user (e.g. by image or speech recognition) or obtained an identification of the user or a group the user belongs to from an object carried by the user (e.g. a mobile device, tag or the like); and vocal command set change features/methods correlated that identification to a command set of a group or for the individual identified user. Other levels of group identification and command set selection (and attendant software changes) may be utilized. For example, an accent may be identified from detection of user's speech or based on region or location (e.g. of the user's home region associated with a mobile device or the like). This accent or location detection is considered an identification of a user or group of users associated with the accent or location. Then a modified command set is selected and corresponding software-change data is supplied to a control module to tune the recognized vocal commands to match the regional accent.

Other types of command adjustment, such as recognized vocabulary, may be based on detection of region or location of the module and/or of an identified user or group. For example, in America, the use of words like TV or television are common, but may not be in other parts of the world. When people from Britain come into an area served by a control module with the customizable embedded vocal command set capability, the recognizable vocal commands may be updated to fit their region—to use a British term like "telley" instead of the American term like TV in this example.

As another example, during initial set-up, the location of a newly installed control module is detected (e.g. automatically by an installer's mobile device and suitable application). The voice responsive software may then be updated to match the location, e.g. to match language, local dialect terms or accent.

As an example of an expanded use case for the voice responsive control module, the controlled equipment need not be in the general vicinity of the voice responsive control module. The control module, for example, may be configured to communicate with equipment at a more remote location (e.g. off-premises) to obtain requested information and/or control operations of the remote equipment based on recognized utterances of a customized vocal command set.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed:

1. A control module, comprising:
a coupling for signaling to equipment to be controlled by the control module;
a control module housing;
a microphone outside the control module housing;
an audio processor coupled to the microphone;
a data processor inside the control module housing coupled to the audio processor and to the coupling;
a memory accessible by the data processor; and
software in the memory, the software including:
voice response software for the data processor, to configure the control module to, without requiring network communication, recognize a first set of vocal commands in a first dialect of a language to control the equipment in response to speech detected via the microphone and the audio processor and issue control signals to the equipment via the coupling corresponding to respective commands of the first set of vocal commands; and
customization software for the data processor to configure the control module to:
(i) identify a user in the vicinity of the control module; and
(ii) based at least in part on identity of the user, change the voice response software to, configure the control module to: without requiring network communication, recognize a second set of vocal commands to control the equipment in response to speech detected via the microphone and the audio processor, and issue control signals to the equipment via the coupling corresponding to respective commands of the second set of vocal commands,
wherein:
the second set of vocal commands is in a second dialect of the language, and
the control module, the coupling for signaling to equipment to be controlled by the control module, and the equipment to be controlled, comprise a building management system arranged at one premises.

2. The control module of claim 1, wherein:
the coupling is configured for command signaling to controllable lighting equipment or controllable heating, ventilation and air conditioning (HVAC) equipment; and
the software in the memory configures the data processor to issue each control command corresponding to a respective command of the first and second sets of vocal commands in a lighting control protocol or an HVAC control protocol.

3. The control module of claim 1, further comprising:
a sensor coupled to the data processor,
wherein the customization software for the data processor further configures the control module to perform the identification of the user by detecting an identifiable feature of the user when in the vicinity of the control module via the sensor and matching of the detected feature to an identification reference associated with the user stored in the memory.

4. The control module of claim 1, wherein the customization software for the data processor further configures the control module to:
perform the identification of the user by obtaining a identifier of the user via communication with a system in the vicinity of the control module;
receive software-change data associated with the identifier via communication with a software source; and
perform the change of the voice response software based on the received software-change data.

5. The control module of claim 1, further comprising:
a radio-frequency transceiver coupled to the data processor,
wherein the customization software for the data processor further configures the control module to perform the identification of the user by obtaining an identifier of a radio-frequency enabled device of the user when in the vicinity of the control module via the radio-frequency transceiver.

6. The control module of claim 5, wherein the customization software for the data processor further configures the control module to:
receive software-change data associated with the identifier via the radio-frequency transceiver; and
perform the change of the voice response software based on the received software-change data.

7. The control module of claim 1, wherein the customization software for the data processor further configures the control module to:
(iii) identify another user when in the vicinity of the control module; and
(iv) based at least in part on identity of the other user, change the voice response software to, configure the control module to: without requiring network communication, recognize a third set of vocal commands in response to speech detected via the microphone and the audio processor, and issue control signals to the equipment via the coupling corresponding to respective commands of the third set of vocal commands,
wherein the third set of vocal commands is different from and a modification of the first and second sets of vocal commands.

8. The control module of claim 7, wherein:
when the user and the other user are in the vicinity of the control module concurrently, the customization software for the data processor further configures the control module to select between the second and third sets of vocal commands based on:
  which of the user and the other user has higher priority as indicated by a priority list of user identifiers; or
  which of the user and the other user has an identifier at an earlier position in a user queue based on time of entry in the vicinity of the control module.

9. The control module of claim 1, wherein:
the control module, the coupling for signaling to equipment to be controlled by the control module, and the equipment to be controlled, comprise a building management system arranged at one premises.

10. The control module of claim 1, wherein:
the coupling is configured for command signaling to controllable lighting equipment; and
the software in the memory configures the data processor to issue each control command corresponding to a respective command of the first and second sets of vocal commands in a lighting control protocol.

11. The control module of claim 1, wherein the coupling further comprises a wired network connection.

12. A method, comprising:
determining an identified user has rights to establish a customized vocal command set;
forming a voice control profile associated with identification of the user, for the customized vocal command set in a first dialect of a language, wherein, for each respective vocal command of the customized vocal command set, forming the voice control profile comprises:
  (a) receiving at a controllable equipment an input from the user indicating one or more audible utterances defining the respective vocal command;
  (b) receiving an input from the user indicating a control function of the controllable equipment to be implemented in response to automated detection of audio containing the one or more audible utterances defining the respective vocal command; and
  (c) noting, in association in the voice control profile, the one or more audible utterances defining the respective vocal command and the indication of the control function; and
compiling the voice control profile into software-change data for a control module separate from the controllable equipment having embedded vocal command recognition capability; and
based upon detection of the identified user in the vicinity of the control module, changing a previous vocal command set in a second dialect of the language using the compiled software-change data to set-up voice recognition software in memory of the control module to configure the embedded vocal command recognition capability of the control module to:
  (i) recognize each respective command of the customized vocal command set noted in the voice control profile; and
  (ii) issue a control signal to equipment controlled by the control module to implement the control function associated with each respective command of the customized vocal command set,
wherein the forming of the voice control profile includes:
  modifying an existing vocal control profile for the identified user to implement a different and modified version of the previous vocal command set,
  compiling the voice control profile into software-change data, and
  changing, at a building management system arranged at one premises, the previous vocal command set using the compiled software-change data to implement the different and modified version of the previous vocal command set.

13. The method of claim 12, wherein the user inputs are received via a mobile device of the identified user.

14. The method of claim 13, wherein the compiled software-change data is transmitted from the mobile device of the identified user for loading into the memory of the control module, when the mobile device of the identified user is in the vicinity of the control module.

15. The method of claim 12, wherein:
the compiling of the voice control profile into software-change data for the control module is performed via a cloud service; and
the compiled software-change data is transmitted via network communication from the cloud service for loading into the memory of the control module.

16. The method of claim 12, wherein the forming of the voice control profile creates a new vocal control profile for the identified user to implement a new customized vocal command set.

17. The method of claim 12, wherein:
forming the voice control profile associated with identification of the user, compiling the voice control profile into software-change data, and changing the previous vocal command set using the compiled software-change data, all utilize a building management system arranged at one premises.

18. A control module, comprising:
a coupling for signaling to equipment to be controlled by the control module, configured for command signaling to controllable lighting equipment or controllable heating, ventilation and air conditioning (HVAC) equipment;
a microphone;
an audio processor coupled to the microphone;
a data processor coupled to the audio processor and to the coupling;
a memory accessible by the data processor; and
software in the memory, the software including:
voice response software for the data processor, to configure the control module to, without requiring network communication, recognize a first set of vocal commands in a first dialect of a language to control the equipment in response to speech detected via the microphone and the audio processor and issue control signals to the equipment via the coupling corresponding to respective commands of the first set of vocal commands; and
customization software for the data processor to configure the control module to:
  (i) identify a user in the vicinity of the control module;
  (ii) based at least in part on identity of the user, change the voice response software to, configure the control module to: without requiring network communication, recognize a second set of vocal commands to control the equipment in response to speech detected via the microphone and the audio processor, and issue control signals to the equipment via the coupling corresponding to respective commands of the second set of vocal commands; and (iii) issue each control command corresponding to a respective command of the first and second sets of vocal commands in a lighting control protocol or an HVAC control protocol, wherein:
the second set of vocal commands is in a second dialect of the language, and
the control module, the coupling for signaling to equipment to be controlled by the control module, and the equipment to be controlled, comprise a building management system arranged at a single premises.

\* \* \* \* \*